US006718252B2

(12) United States Patent
Kawai et al.

(10) Patent No.: US 6,718,252 B2
(45) Date of Patent: Apr. 6, 2004

(54) CONTROL APPARATUS FOR INTERNAL COMBUSTION ENGINE

(75) Inventors: Katsuhiko Kawai, Nagoya (JP); Hisashi Iida, Kariya (JP); Muneyuki Iwata, Kakamigahara (JP)

(73) Assignee: Denso Corporation, Kariya (JP)

( * ) Notice: Subject to any disclaimer, the term of this patent is extended or adjusted under 35 U.S.C. 154(b) by 205 days.

(21) Appl. No.: 09/981,241

(22) Filed: Oct. 18, 2001

(65) Prior Publication Data

US 2002/0049526 A1 Apr. 25, 2002

(30) Foreign Application Priority Data

Oct. 23, 2000 (JP) ...................................... 2000-328393

(51) Int. Cl.[7] .......................... F02D 41/14; G06F 17/00

(52) U.S. Cl. .................... 701/104; 123/339.2; 701/103; 701/113

(58) Field of Search ......................... 123/339.2, 339.14, 123/339.12, 339.22, 339.23, 339.24, 339.15, 406.21, 406.22, 406.2, 436; 701/113, 103, 109, 104

(56) References Cited

U.S. PATENT DOCUMENTS 4,653,449 A * 3/1987 Kamei et al. ............... 123/478
5,010,866 A * 4/1991 Ohata ......................... 123/352
5,445,136 A 8/1995 Yamashita et al. .......... 123/689
5,479,897 A 1/1996 Kawai et al. ............ 123/339.2
6,152,105 A * 11/2000 Nishimura et al. ..... 123/339.11
6,213,070 B1 * 4/2001 Hashimoto et al. ...... 123/90.15
6,584,956 B2 * 7/2003 Machida ................ 123/406.47

* cited by examiner

*Primary Examiner*—Henry C. Yuen
*Assistant Examiner*—Johnny H. Hoang
(74) *Attorney, Agent, or Firm*—Nixon & Vanderhye P.C.

(57) ABSTRACT

Calculation of a present air-fuel ratio correction coefficient correction value ΔFAF (i) is based on a control parameter calculated by an ECU, a change in air-fuel ratio detected by an air-fuel ratio sensor, a deviation of an actual air-fuel ratio from a target air-fuel ratio and an immediately preceding air-fuel ratio correction coefficient correction value ΔFAF (i−1) Then, a present air-fuel ratio correction coefficient FAF (i) is found by adding the present air-fuel ratio correction coefficient correction value ΔFAF (i) to an immediately preceding air-fuel ratio correction coefficient FAF (i−1). As a result, the air-fuel ratio correction coefficients is not be thrown into confusion and no phenomenon of the air-fuel ratio being thrown into confusion occurs even if the control parameter is changed in accordance with operating conditions of the engine.

14 Claims, 16 Drawing Sheets

CONTROL APPARATUS FOR INTERNAL COMBUSTION ENGINE

CROSS REFERENCE TO RELATED APPLICATION

This application is based on and incorporates herein by reference Japanese Patent Application No. 2000-328393 filed on Oct. 23, 2000.

BACKGROUND OF THE INVENTION

1. Field of the Invention

The present invention relates to a control apparatus used for an internal combustion engine for controlling a fuel-injection volume or an air-fuel ratio.

2. Description of Related Art

A three-way catalyst is installed within an exhaust pipe and used for cleaning exhausted gas. An air-fuel ratio sensor is provided at the upstream side of the three-way catalyst. The fuel-injection amount is adjusted by execution of state feedback control. In detail, the air-fuel ratio of the exhausted gas is controlled to a value in the cleaning window of the catalyst, that is, a value close to a stoichiometric air-fuel ratio, by monitoring a signal output by the air-fuel ratio sensor. By execution of such feedback control, the exhausted gas can be cleaned with a high degree of efficiency. As disclosed in JP-A-7-11995, in the control of the air-fuel ratio, control objects ranging from a fuel injection valve to an air-fuel ratio sensor are modeled, and a feedback gain of a state feedback loop is calculated by using an optimum regulator. The feedback gain is then used for calculating an air-fuel ratio correction coefficient. Finally, a fuel-injection amount is calculated by correction of a basic fuel-injection amount, which is found from the operating conditions of the engine, by using the air-fuel ratio correction coefficient and others.

With the conventional air-fuel ratio control, the feedback gain cannot be changed continuously in accordance with the operating conditions of the engine. Thus, in order to make the control system stabile, control must be executed at a small feedback gain. As a result, the air-fuel ratio control has a shortcoming that the precision of the air-fuel ratio control is poor.

SUMMARY OF THE INVENTION

A first object of the present invention is to provide a control apparatus for an internal combustion engine that is capable of varying a control parameter of a feedback control system of the internal combustion engine continuously in accordance with an operating conditions of the engine and capable of improving control precision.

A second object of the present invention is to provide a control apparatus for an internal combustion engine that is capable of calculating a control parameter of a feedback control system of the internal combustion engine in a real-time manner.

In general, an air-fuel ratio correction coefficient FAF (i) is calculated based on control parameters F0 through Fd+1 by using the following equation:

$$FAF(i)=F\mathbf{1}\cdot\lambda(i)+F\mathbf{2}\cdot FAF(i-\mathbf{1})+F\mathbf{3}\cdot FAF(i-\mathbf{2})+\ldots+Fd+1\cdot FAF(1-d)+F\mathbf{0}\cdot\Sigma(\lambda\text{ref}-\lambda(i)$$

where notations λ(i) denotes the present air-fuel ratio, notations FAF (i–1) through FAF (i–d) each denote a previous air-fuel ratio correction coefficient and notation λref denotes a target air-fuel ratio or a target air excess ratio.

In this method of calculating the air-fuel ratio correction coefficient, however, when the values of the control parameters F0 through Fd+1 are changed in accordance with operating conditions and the like, the air-fuel ratio correction coefficient FAF is temporarily thrown into confusion at that moment. As a result, it is quite within the bounds of possibility that there occurs a phenomenon of a temporary confusion state of the air-fuel ratio λ.

In order to solve the problem, the present air-fuel ratio correction coefficient is found by using the following equation:

$$FAF(i)=FAF(i-\mathbf{1})+\Delta FAF(i)$$

where notation FAF (i) denotes the present air-fuel ratio correction coefficient, notation FAF (i–1) denotes the immediately preceding air-fuel ratio correction coefficient and notation ΔFAF (i) denotes a correction value for correcting the present air-fuel ratio correction coefficient FAF (i). The correction value ΔFAF (i) is found by a correction value processing means on the basis of a control parameter calculated by a control parameter processing means, an air-fuel ratio change detected by an air-fuel ratio detecting means, a deviation of an actual air-fuel ratio from a target air-fuel ratio and a previous correction value for correcting the air-fuel ratio correction coefficient.

By finding the present air-fuel ratio correction coefficient in this way, the air-fuel ratio correction coefficient is no longer temporarily thrown into confusion even if the values of the control parameters are changed in accordance with operating conditions and the like. Thus, it is out of the bounds of possibility that there occurs a phenomenon of a temporary confusion state of the air-fuel ratio λ. As a result, stable control of the air-fuel ratio can be executed while the values of the control parameters are being changed in accordance with operating conditions and the like.

Feedback control systems of an internal combustion engine include an idle-operation-speed control system in addition to the air-fuel ratio feedback control system.

According to the present invention, these feedback control systems each comprise a state-detecting means for detecting the state of a control object, a state variation outputting means for outputting present and previous operation amounts as well as present and previous state detection values detected by the state detecting means as a state variable representing an internal state of a control model, and a control parameter processing means for finding a control parameter by using model parameters of the control model. A correction value processing means finds an operation amount correction value based on a difference between a control parameter found by the control parameter processing means, a state variable output by the state variation outputting means, and a deviation of a detection value output by the state-detecting means from a control target value. An operation amount processing means adds the operation amount correction value to a previous operation amount in order to attain a present operation amount.

By finding the present control amount in this way, the state of the control object is no longer temporarily thrown into confusion even if the values of the control parameters of the control object are changed in accordance with operating conditions and the like. As a result, stable control of the control object can be executed while the values of the control parameters are being changed in accordance with operating conditions and the like.

BRIEF DESCRIPTION OF THE DRAWINGS

Additional objects and advantages of the present invention will be more readily apparent from the following detailed description of preferred embodiments thereof when taken together with the accompanying drawings in which.

PREFERRED DESCRIPTION OF PREFERRED EMBODIMENTS

First Embodiment

A first embodiment of the present invention will be explained with reference to FIGS. 1–13 as follows.

Figure 1:
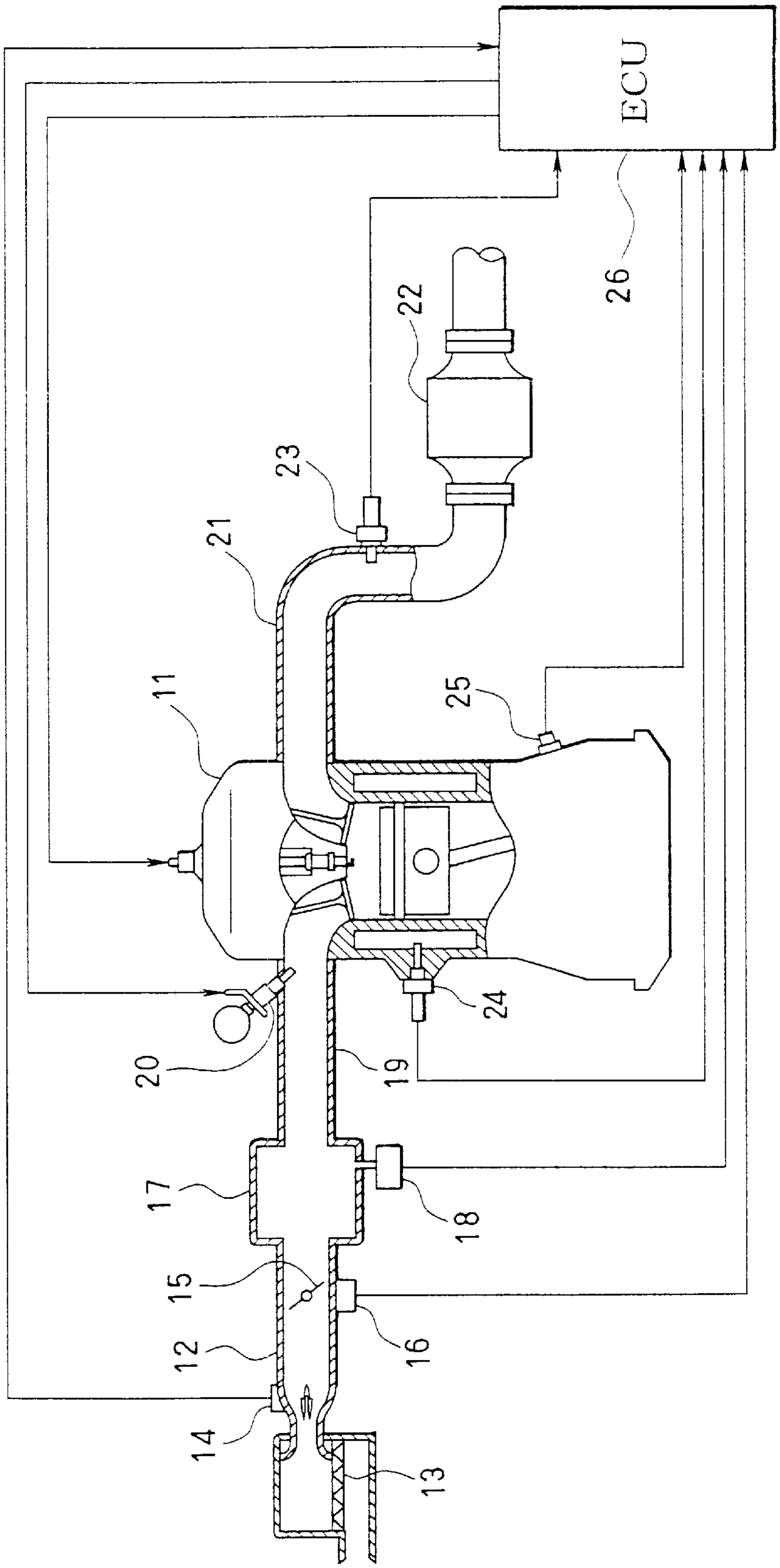
FIG. 1 is a schematic view showing an engine control system (first embodiment)

FIG. 1 shows an entire engine control system. An engine 11 is an internal combustion engine. At the beginning of the upstream portion of an intake pipe 12 provided for the engine 11, an air cleaner 13 is provided. On the downstream side of the air cleaner 13, there is provided an airflow meter 14 for measuring an intake-air volume. On the downstream side of the air-flow meter 14, there are provided a throttle valve 15 and a throttle opening sensor 16 for detecting a throttle opening degree.

A surge tank 17 is installed on the downstream side of the throttle valve 15. Within the surge tank 17, there is provided an intake-pipe-pressure sensor 18 for detecting a pressure in the intake pipe. In addition, within the surge tank, there is also provided an intake manifold 19 for introducing air to each cylinder of the engine 11. In the vicinity of an intake port of the intake manifold 19 provided for each cylinder, there is installed a fuel injection valve 20 for injecting fuel to each cylinder.

In an intermediate of an exhaust pipe 21 of the engine 11, on the other hand, there is provided a catalyst 22 such as a three-way catalyst for reducing the quantities of harmful components included in exhausted gas. Examples of the harmful components are CO, HC and NOx. On the upstream side of the catalyst 22, there is provided an air-fuel ratio sensor 23 (an air-fuel ratio detecting means or a state-detecting means) for detecting the air-fuel ratio of exhausted gas. In addition, in a cylinder block of the engine 11, there are provided a cooling-water-temperature sensor 24 for detecting the temperature of cooling water and a crank angle sensor 25 for detecting the speed of the engine 11.

Signals output by the sensors are supplied to an engine control unit (ECU) 26. The ECU 26 includes a microcomputer as a core component. The microcomputer executes programs stored in a ROM serving as a storage medium embedded therein to compute an air-fuel ratio correction coefficient FAF and control a fuel-injection volume of the fuel injection valve 20.

In general, an air-fuel ratio correction coefficient FAF (i) is computed from control parameters (or, to be more specific, control gains) F0 to Fd+1 by using the following equation:

$$FAF(i)=F1\cdot\lambda(i)+F2\cdot FAF(i-1)+F3\cdot FAF(i-2)+1\ \ldots$$

$$\ldots\ +\mathrm{Fd}+1\cdot FAF(i-d)+F0\cdot\Sigma(\lambda\mathrm{ref}-\lambda(i)$$

where notation $\lambda$(i) denotes the present air-fuel ratio (or the present excess air ratio), notations FAF (i–1) to FAF (i–d) each denote a previous air-fuel ratio correction coefficient and notation $\lambda$ref denotes a target air-fuel ratio or a target air excess ratio.

In this method of computing the air-fuel ratio correction coefficient, however, when the values of the control parameters F0 to Fd+1 are changed in accordance with operating conditions and the like, the air-fuel ratio correction coefficient FAF is temporarily thrown into confusion at that moment. As a result, it is quite within the bounds of possibility that there occurs a phenomenon of a temporary confusion state of the air-fuel ratio $\lambda$.

In order to solve the problem, in the first embodiment, the present air-fuel ratio correction coefficient is found by using the following equation:

$$FAF(i)=FAF(i-1)+\Delta FAF(i)$$

where notation FAF (i) denotes the present air-fuel ratio correction coefficient, notation FAF (i–1) denotes an immediately preceding air-fuel ratio correction coefficient and notation ΔFAF (i) denotes a correction value for correcting the present air-fuel ratio correction coefficient FAF (i). Computation of the correction value ΔFAF (i) is described below.

The correction value ΔFAF (i) is found in accordance with the following equation:

$$\Delta FAF(i)=F1\cdot\Delta\phi(i)+F2\cdot\Delta FAF(i-1)+\ \ldots$$

$$\ldots\ Fd+1+\Delta FAF(i-d)+Fd+2\cdot\Delta FAF(i-d-1)\ +F0\cdot(\phi\mathrm{ref}-\phi(i))$$

where notation $\Delta\phi(i)$ denotes a change in fuel excess ratio, that is, $\Delta\phi(i)=\phi(i)-\phi(i-1)$, notations ΔFAF (i–1) to ΔFAF (i–d–1) each denote a previous air-fuel ratio correction coefficient correction value and notation $\phi$ref denotes a target fuel excess ratio. It should be noted that, even though a fuel excess ratio $\phi$ is used as information serving as a substitute for the air-fuel ratio in the above equation, the air excess ratio $\lambda$ can of course be used as well.

By finding the present air-fuel ratio correction coefficient in accordance with the above equations, the air-fuel ratio correction coefficient is no longer temporarily thrown into confusion even if the values of the control parameters are changed in accordance with operating conditions and the like. Thus, it is out of the bounds of possibility that there occurs a phenomenon of a temporary confusion state of the air-fuel ratio $\lambda$. As a result, stable control of the air-fuel ratio can be executed while the values of the control parameters F0 to Fd+2 are being changed in accordance with operating conditions and the like.

Figure 2:
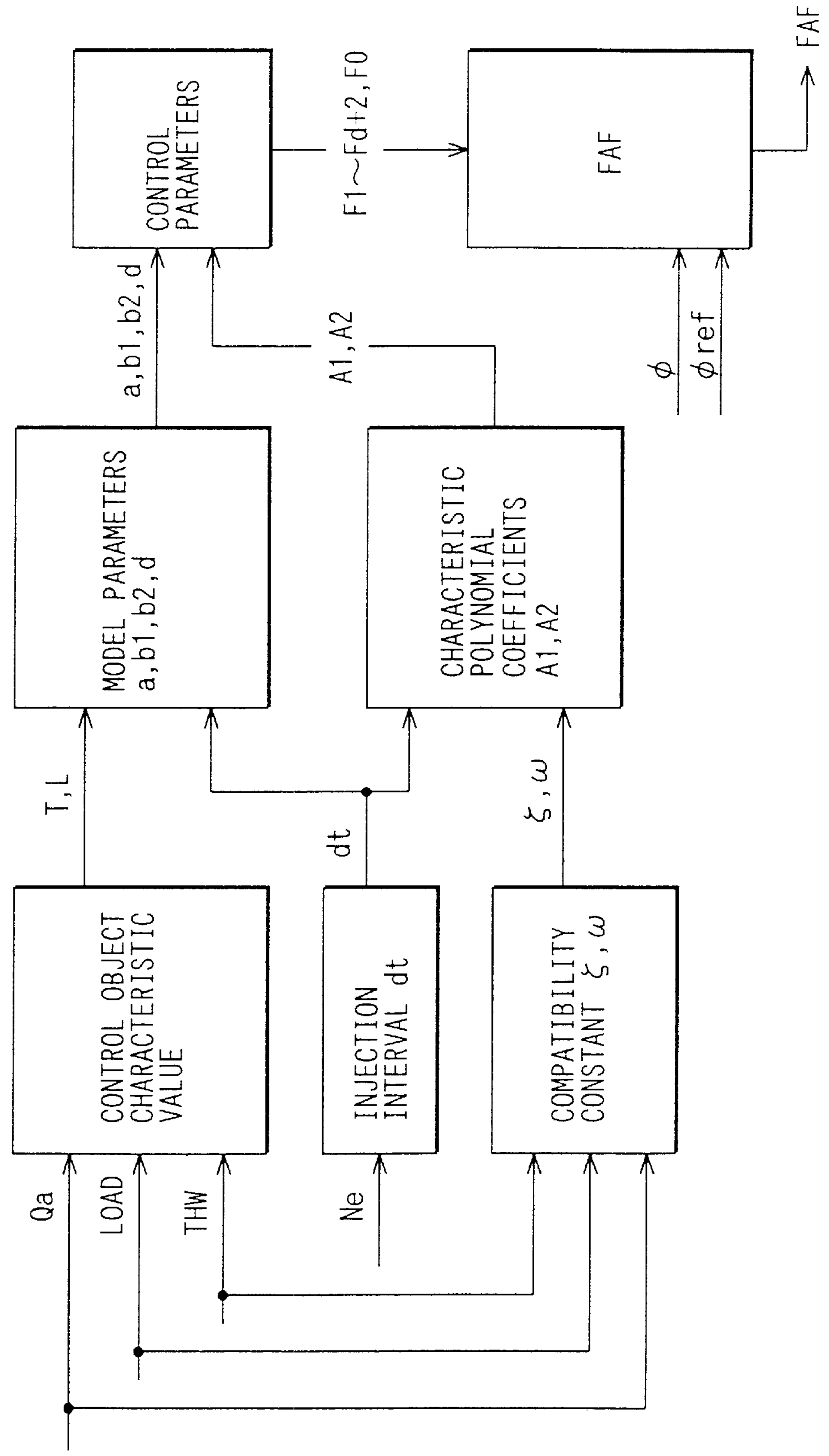
FIG. 2 is a block diagram showing functions of various components composing an air-fuel ratio feedback control system (first embodiment)

FIG. 2 is a functional block diagram showing functions of various components composing an air-fuel ratio feedback control system for computing an air-fuel ratio correction coefficient FAF in accordance with the above equations. The functions of the air-fuel ratio feedback control system are implemented by the ECU 26 through execution of programs represented by flowcharts shown in FIGS. 3–10. The following description explains details of pieces of processing which are represented by the programs.

Calculation of the Fuel-Injection Amount

Figure 3:
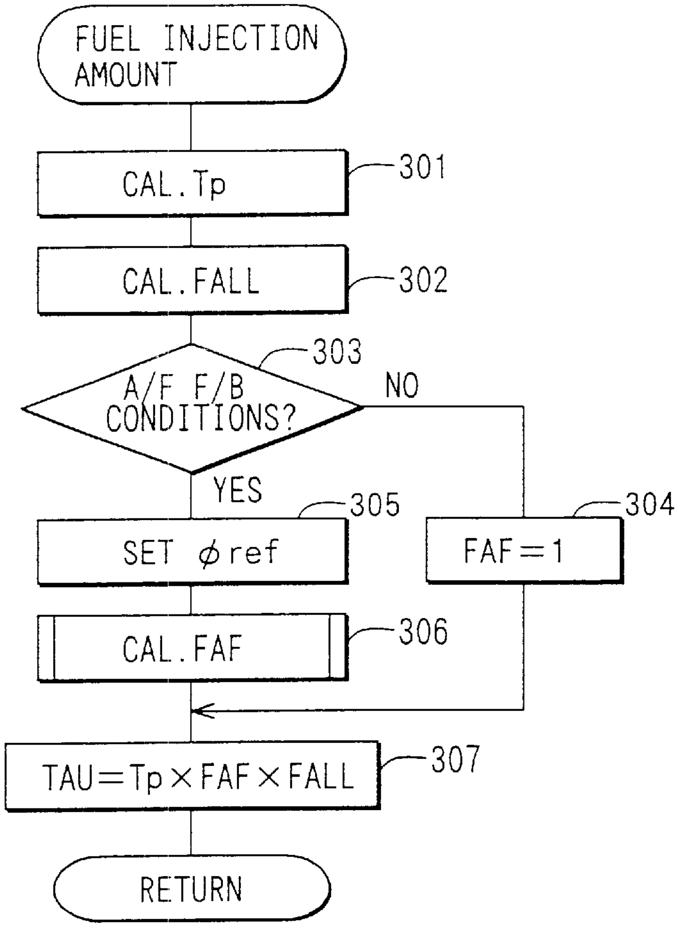
FIG. 3 is a flowchart showing a fuel injection amount calculation program (first embodiment)

A fuel-injection-amount calculation program represented by a flowchart shown in FIG. 3 is activated synchronously with an injection timing of each cylinder to calculate a fuel-injection amount TAU as follows. The flowchart begins with a step 301 at which a basic fuel-injection amount Top is calculated from typically a map in accordance with the present operating conditions of the engine 11. Then, at the next step 302, a variety of correction coefficients FALL for the basic fuel-injection amount is calculated. Examples of the correction coefficients FALL are a correction coefficient according to the temperature of the cooling water and a correction coefficient related to acceleration or deceleration of the vehicle. The flow of the program then goes on to a step 303 to determine whether air-fuel ratio feedback conditions are satisfied. If the air-fuel ratio feedback conditions are not satisfied, the air-fuel ratio correction coefficient FAF is set at 1 and the air-fuel ratio is adjusted by open-loop control.

Figure 10:
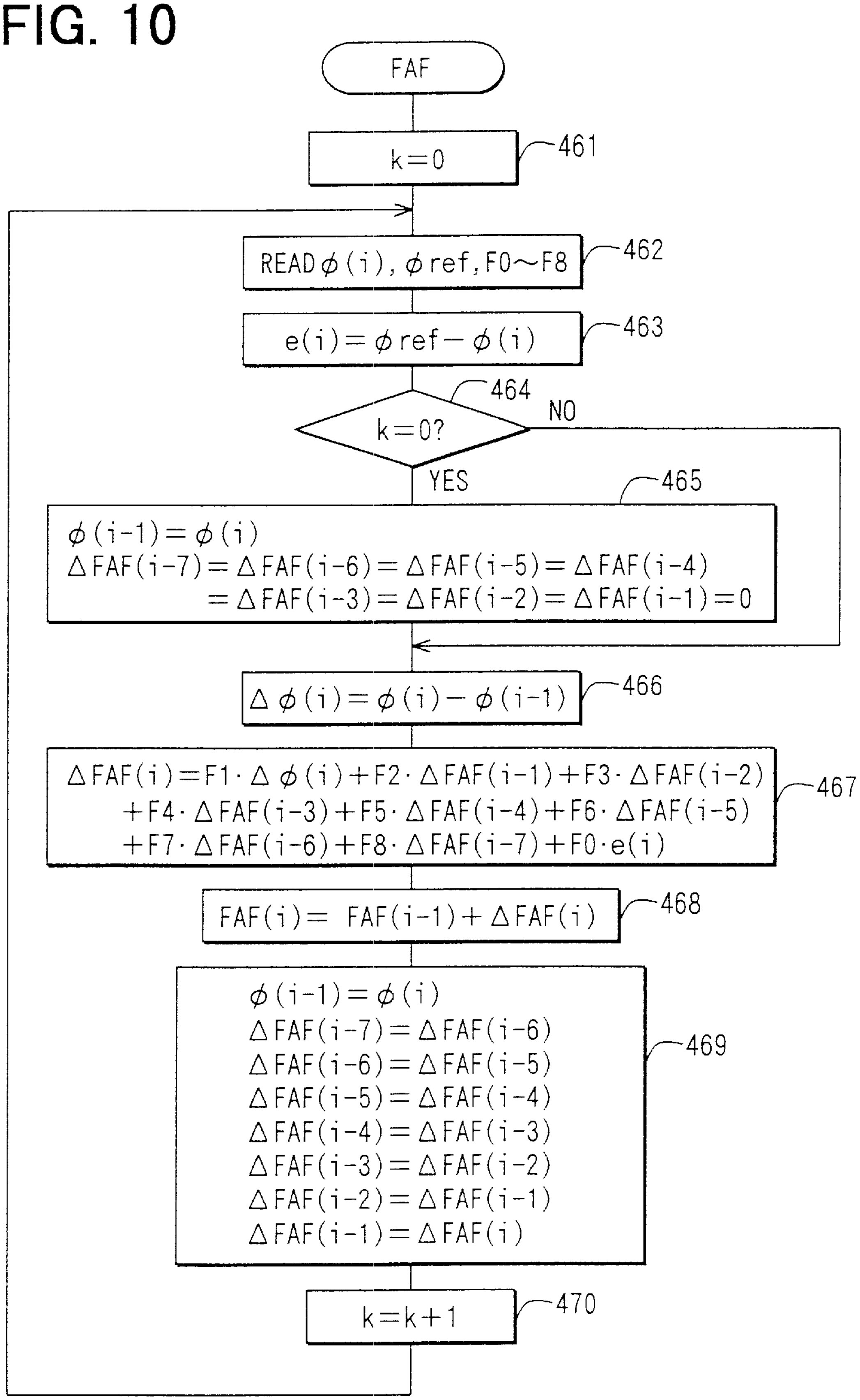
FIG. 10 is a flowchart showing a FAF calculation program (first embodiment)

If the air-fuel ratio feedback conditions are satisfied, on the other hand, the flow of the program goes on to a step 305 at which the target fuel excessive rate $\phi$ref is set at such a value that puts the air-fuel ratio of the exhausted gas in the cleaning window of the catalyst 22, that is, a value close to a stoichiometric air-fuel ratio. Subsequently, at the next step 306, a FAF calculation program represented by the flowchart shown in FIG. 10 is executed to compute the air-fuel ratio correction coefficient. The FAF-processing program will be described later.

As described above, after the air-fuel ratio correction coefficient has been set at the step 304 or 306, the flow of the program goes on to a step 307 at which a fuel-injection amount TAU is calculated by multiplication of the basic fuel-injection amount Tp by the air-fuel ratio correction coefficient FAF and the various correction coefficients FALL. In this way, the air-fuel ratio of the exhausted gas is controlled to a value in the cleaning window of the catalyst 22.

Calculation of Control Object Characteristic Value

Figure 4:
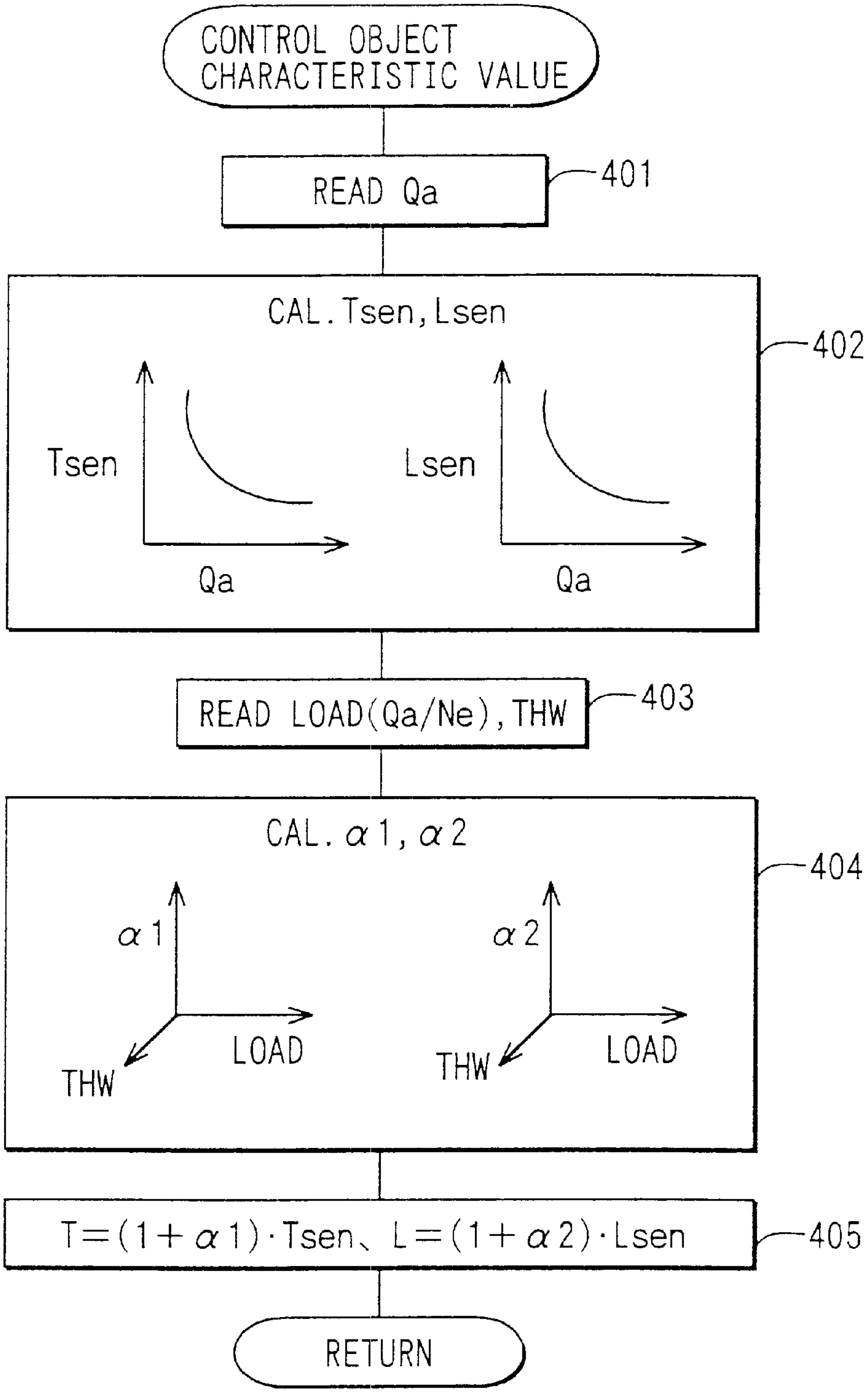
FIG. 4 is a flowchart showing a control object characteristic amount calculation program (first embodiment)

A control object characteristic value calculation program represented by a flowchart shown in FIG. 4 is activated synchronously with an injection timing of each cylinder to calculate characteristic values of the control object as described below. The characteristic values are a model time constant T and a dead time L. The flowchart begins with a step 401 at which an intake-air volume Qa is read in. At the next step 402, a basic model time constant Tsen and a basic dead time Lsen are found from a map providing values of the basic model time constant Tsen and the basic dead time Lsen as a function of intake-air amount Qa.

Subsequently, at the next step 403, loads (Qa/Ne) and a cooling-water temperature THW are read in. Then, at the next step 404, a time-constant correction coefficient $\alpha 1$ and a dead-time correction coefficient $\alpha 2$ are found from a map providing values as functions of load and cooling-water temperature THW respectively. It should be noted that, in addition to the load and the cooling-water temperature THW used as operating-state parameters in the map for finding a time-constant correction coefficient $\alpha 1$ and a dead-time correction coefficient $\alpha 2$, the speed of the engine 11 and the lapse of time since the start of the engine 11 can also be used as parameters.

After a time-constant correction coefficient $\alpha 1$ and a dead-time correction coefficient $\alpha 2$ have been found, the flow of the program goes on to a step 405 at which a model time constant T and a dead time L are calculated from the time-constant correction coefficient $\alpha 1$, the dead-time correction coefficient $\alpha 2$, the basic model time constant Tsen and the basic dead time Lsen in accordance with the following equations:

$$T=(1+\alpha 1)\cdot Tsen$$

$$L=(1+\alpha 1)\cdot Lsen$$

Then, the execution of the program is ended.

Calculation of an Injection Interval

Figure 5:
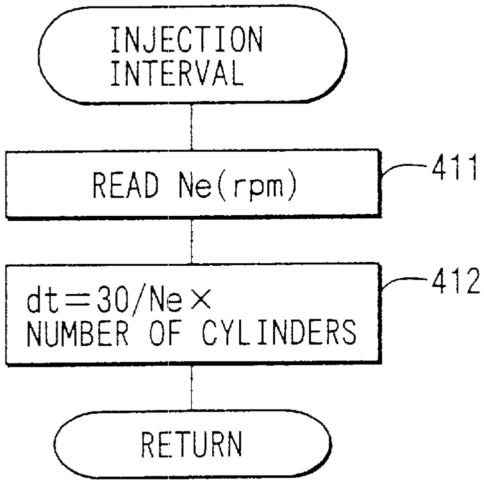
FIG. 5 is a flowchart showing an injection interval calculation program (first embodiment)

An injection interval calculation program represented by a flowchart shown in FIG. 5 is activated synchronously with an injection timing of each cylinder to compute the injection interval as described below. The flowchart begins with a step 411 at which an engine speed Ne (rpm) is read in. Subsequently, at the next step 412, the injection interval dt is calculated in accordance with the following equation:

$$dt=30/Ne\times\text{Number of cylinders}$$

Then, the execution of the program is ended.

Figure 6:
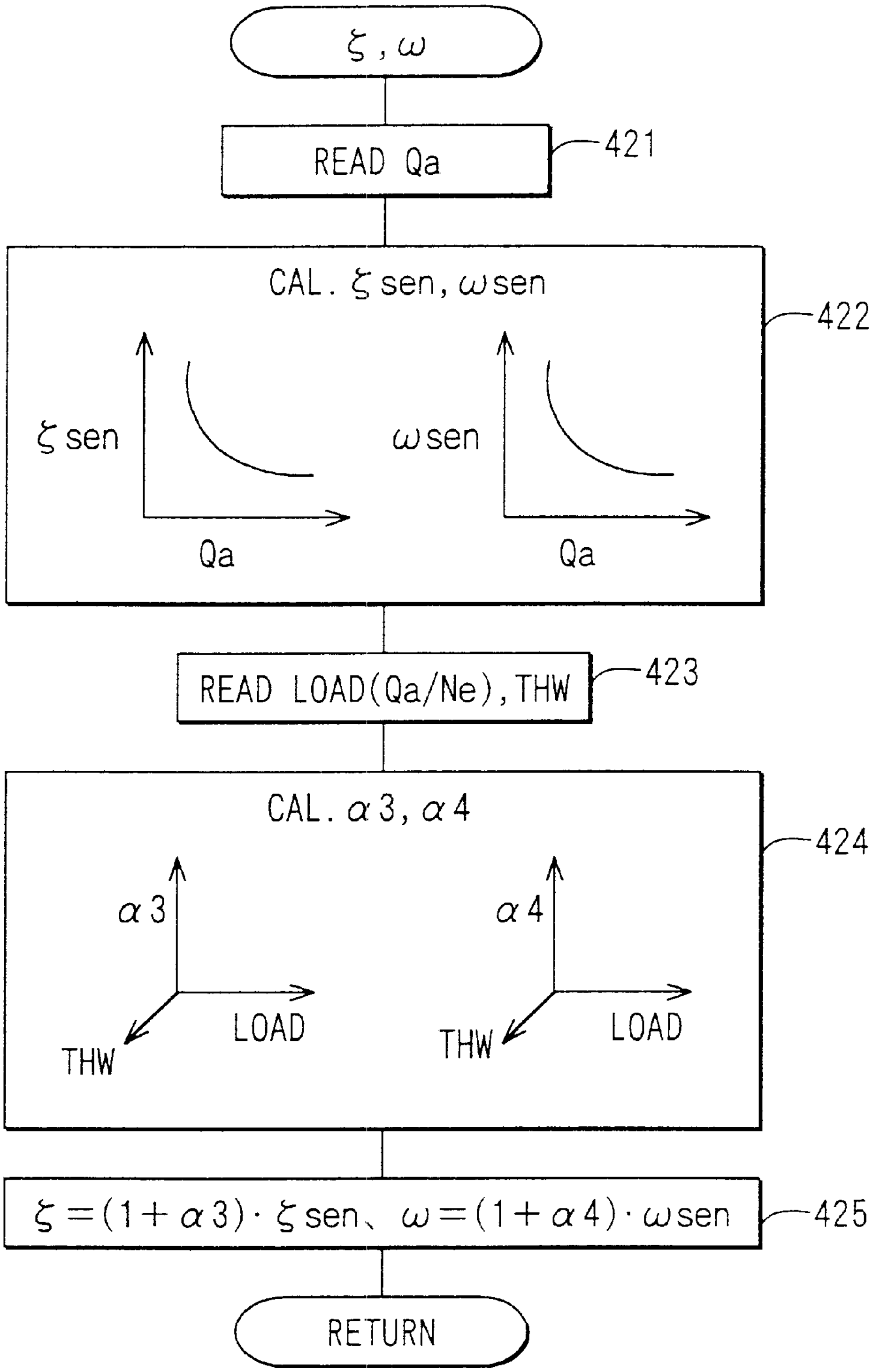
FIG. 6 is a flowchart showing an attenuation coefficient $\zeta$ and undamped natural angular frequency $\omega$ calculation program (first embodiment)

Calculation of Attenuation Coefficient $\zeta$ and Undumped Natural Angular Frequency $\omega$ An attenuation coefficient $\zeta$ and undamped natural angular frequency $\omega$ computation program represented by a flowchart shown in FIG. 6 is activated synchronously with an injection timing of each cylinder to compute the attenuation coefficient $\zeta$ and the undamped natural angular frequency $\omega$ as described below. The flowchart begins with a step 421 at which an intake-air amount Qa is read in. Then, at the next step 422, a basic attenuation coefficient $\zeta$sen and a basic undamped natural angular frequency $\omega$sen are found from a map using the intake-air amount Qa as a parameter.

Subsequently, at the next step 423, loads (Qa/Ne) and a cooling-water temperature THW are read in. Then, at the next step 424, an attenuation-coefficient correction coefficient $\alpha 3$ and an undamped natural angular frequency correction coefficient $\alpha 4$ are found from a map providing values as functions of load and cooling-water temperature THW respectively. It should be noted that, in addition to the load and the cooling-water temperature THW used as operating-state parameters in the map for finding an attenuation-coefficient correction coefficient $\alpha 3$ and an undamped natural angular frequency correction coefficient $\alpha 4$, the speed of the engine 11 and the lapse of time since the start of the engine 11 can also be used as parameters.

After an attenuation-coefficient correction coefficient $\alpha3$ and an undamped natural angular frequency correction coefficient $\alpha4$ have been found, the flow of the program goes on to a step 425 at which an attenuation coefficient $\zeta$ and an undamped natural angular frequency $\omega$ are calculated from the attenuation coefficient correction coefficient $\alpha3$, the undamped natural angular frequency correction coefficient $\alpha4$, the basic attenuation coefficient $\zeta sen$ and the basic undamped natural angular frequency $\omega sen$ in accordance with the following equations:

$$\zeta=(1+\alpha3)\cdot\zeta sen$$

$$\omega=(1+\alpha4)\cdot\omega sen$$

Then, the execution of the program is ended.

The attenuation coefficient $\zeta$ and the undamped natural angular frequency $\omega$ each correspond to a pole which is treated as a target in the present invention. In the present first embodiment, the attenuation coefficient $\zeta$ and the undamped natural angular frequency $\omega$ are set at fast responses for a large-air-amount operation but at slow responses for a small-air-amount operation. Thus, the responsiveness and the stability of the air-fuel ratio feedback control system can be both established at the same time.

Calculation of Model Parameters

Figure 7:
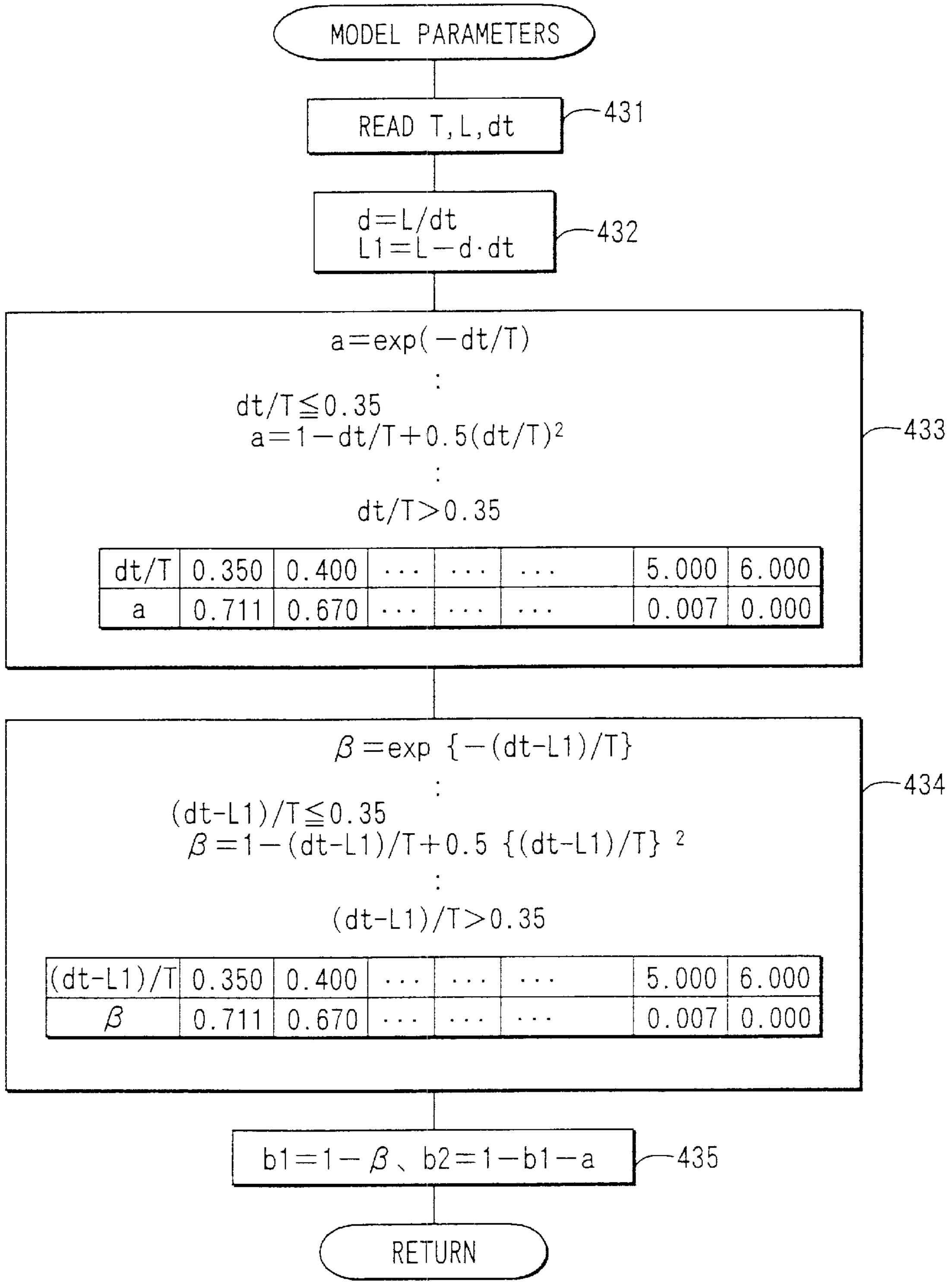
FIG. 7 is a flowchart showing a model-parameter calculation program (first embodiment)

A model parameter calculation program represented by a flowchart shown in FIG. 7 is activated synchronously with an injection timing of each cylinder to compute model parameters a, b1 and b2 as described below. The flowchart begins with a step 431 at which a model time constant T, a dead time L and a fuel-injection interval dt are read in. Then, at the next step 432, a transformed dead time d (=L/dt) is found with the fuel-injection interval dt (processing interval) used as a reference and the fraction part after the decimal point truncated. In addition, a truncation error L1 (=L−d·dt) is computed.

Subsequently, at the next step 433, the model parameter "a" is calculated from the model time constant T and the fuel-injection interval dt in accordance with the following equation:

$$a=\exp(-dt/T)$$

Even though the above processing of exp (−dt/T) entails the use of a CPU having high performance, the processing power of a CPU employed in the present onboard computer is considered to be hardly enough for carrying out the processing at a high speed. In order to reduce the processing load, in the first embodiment, the expression exp (−dt/T) is approximated to give the following approximation equation for calculating the model parameter "a" for dt/T not exceeding a typical value of 0.35.

$$a=1-dt/T+0.5(dt/T)^2$$

With this approximation equation, however, a processing error increases as the value of dt/T rises. In a region where dt/T is larger than the typical value of 0.35, for example, a relation between dt/T and the model parameter "a" is put in a table stored in a ROM in advance. Thus, the table can be searched for a model parameter "a" corresponding to the current value of dt/T. It should be noted that the use of a table for finding a model parameter "a" corresponding to the current value of dt/T can also be applied to dt/T smaller than the typical value of 0.35.

Then, at the next step 434, a variable $\beta$ used in calculation of the model parameters b1 and b2 is calculated by using the following equation:

$$\beta=\exp\{-(dt-L1)/T\}$$

Also in order to reduce the processing load to calculate the variable $\beta$, the expression exp{−(dt−L1)/T} is approximated to give the following approximation equation for calculating the variable $\beta$ for (dt−L1)/T not exceeding a typical value of 0.35.

$$\beta=1-(dt-L1)/T+0.5\{(dt-L1)/T\}^2$$

With this approximation equation, however, a processing error increases as the value of (dt−L1)/T rises. In a region where (dt−L1)/T is larger than the typical value of 0.35, for example, a relation between (dt−L1)/T and the variable $\beta$ is put in a table stored in a ROM in advance. Thus, the table can be searched for a variable $\beta$ corresponding to the current value of (dt−L1)/T. It should be noted that the use of a table for finding a variable $\beta$ corresponding to the current value of (dt−L1)/T can also be applied to (dt−L1)/T smaller than the typical value of 0.35.

Then, at the next step 435, the model parameters b1 and b2 are calculated based on the variable $\beta$ and the model parameter a by using the following equation:

$$b1=1-\beta$$

$$b2=1-b1-a$$

Calculation of Characteristic Polynomial Coefficients

Figure 8:
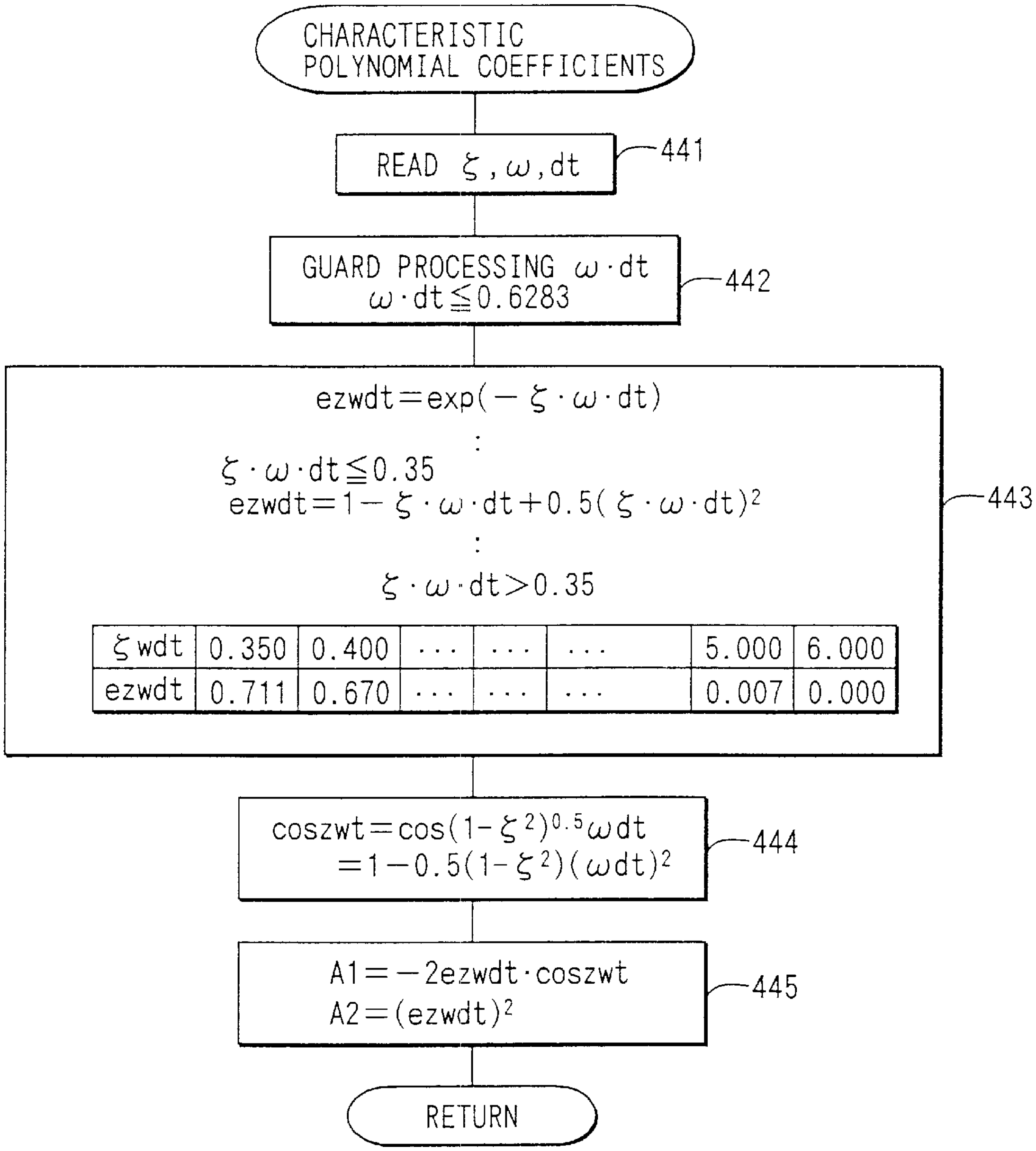
FIG. 8 is a flowchart showing a characteristic polynomial coefficient calculation program (first embodiment)

A characteristic polynomial coefficient calculation program represented by a flowchart shown in FIG. 8 is activated synchronously with an injection timing of each cylinder to calculate characteristic polynomial coefficients A1 and A2 by adoption of a pole-assignment method of setting a root of the dead time L of the control model at 0 in accordance with the first embodiment as described below. It should be noted that the pole-assignment method is described in detail in the specification of Japanese Application No. 2000-189734.

When activated, the program starts with a step 441 at which an attenuation coefficient $\zeta$, an undamped natural angular frequency $\omega$ and a fuel injection interval dt are read in. At the next step 442, a product $\omega\cdot dt$ is subjected to guard processing imposing a typical upper guard value of 0.6283. In detail, if the product $\omega\cdot dt$ exceeds the upper guard value, the product $\omega\cdot dt$ set at the upper guard value. If the product $\omega\cdot dt$ is smaller than or equal to the upper guard value, on the other hand, the product $\omega\cdot dt$ is used as it is. The product $\omega\cdot dt$ is subjected to guard processing as described above because an excessively large value of the product $\omega\cdot dt$ lowers the control precision.

At the next step 443 following the guard processing of the product $\omega\cdot dt$, a variable ezwdt used in calculation of the characteristic polynomial coefficients A1 and A2 is calculated by using the following equation:

$$ezwdt=\exp(-\zeta\cdot\omega\cdot dt)$$

In order to reduce the processing load of the CPU, the expression $\exp(-\zeta\cdot\omega\cdot dt)$ is approximated to give the following approximation equation for calculating the variable ezwdt for dt/T not exceeding a typical value of 0.35.

$$ezwdt=1-\zeta\cdot\omega\cdot dt+0.5\cdot(\zeta\cdot\omega\cdot dt)^2$$

With this approximation equation, however, a processing error increases as the value of $\zeta\cdot\omega\cdot dt$ rises. In a region where $\zeta\cdot\omega\cdot dt$ is larger than the typical value of 0.35, for example, a relation between $\zeta\cdot\omega\cdot dt$ and the variable ezwdt is put in a table stored in a ROM in advance. Thus, the table can be searched for a variable ezwdt corresponding to the current value of $\zeta\cdot\omega\cdot dt$. It should be noted that the use of a table for finding a variable ezwdt corresponding to the current value of $\zeta\cdot\omega\cdot dt$ can also be applied to $\zeta\cdot\omega\cdot dt$ smaller than the typical value of 0.35.

Then, at the next step 444, a variable cos zwt used in calculation of the characteristic polynomial coefficients A1 and A2 is calculated by using the following equation:

$$\cos zwt=\cos\{((1-\zeta^2)^{0.5})\cdot\omega\cdot dt\}$$

Also in order to reduce the processing load of the CPU, the following approximation equation is used for calculating the variable cos zwt:

$$\cos zwt=1-0.5\cdot(1-\zeta^2)\cdot(\omega\cdot dt)^2$$

Subsequently, at the next step 445, the characteristic polynomial coefficients A1 and A2 are calculated from the variables ezwdt and cos zwt in accordance with the following equation:

$$A1=-2\cdot ezwdt\cdot\cos zwt$$

$$A2=(ezwdt)^2$$

Calculation of Control Parameters

Figure 9:
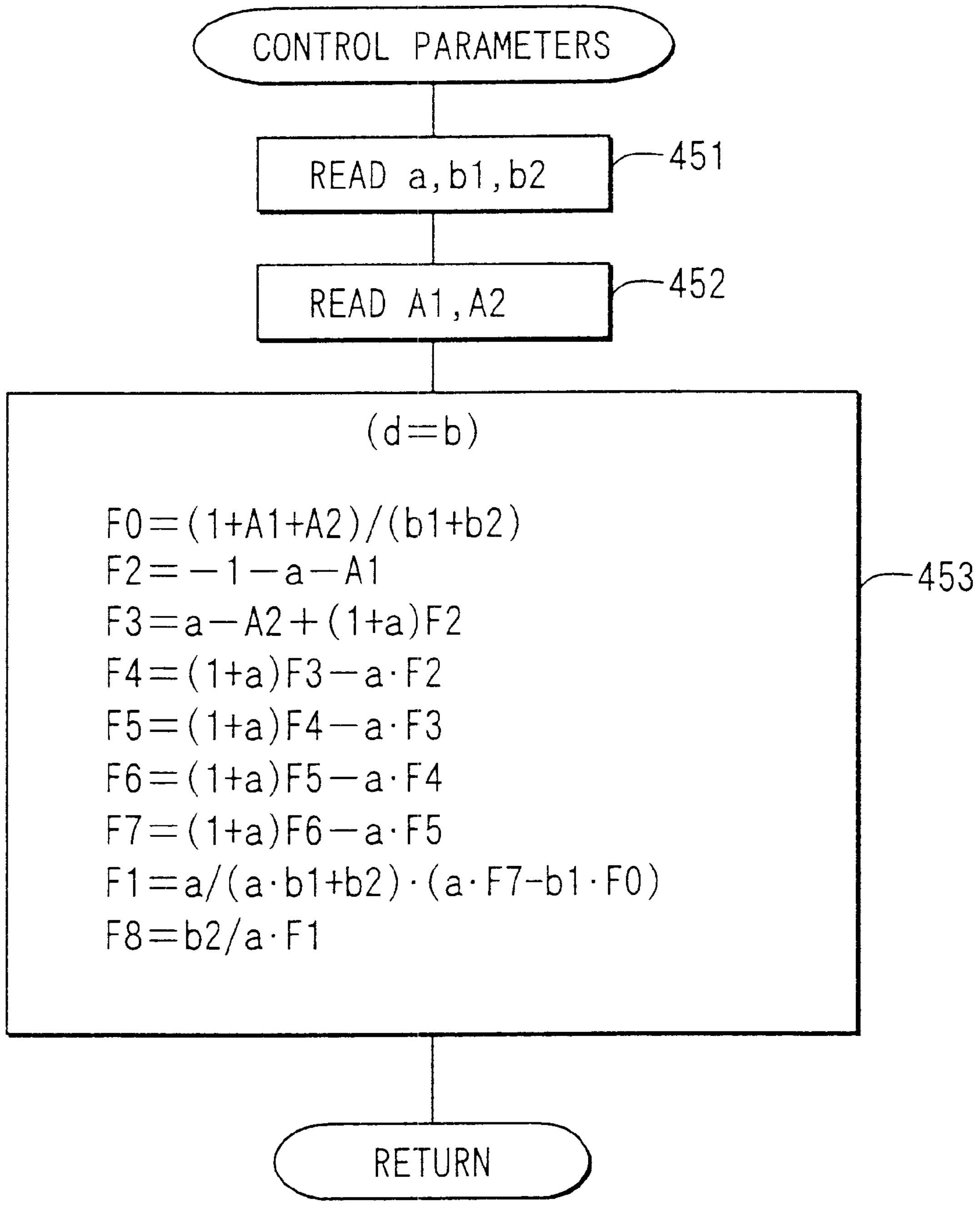
FIG. 9 is a flowchart showing a control-parameter calculation program (first embodiment)

A control-parameter computation program represented by a flowchart shown in FIG. 9 is activated synchronously with an injection timing of each cylinder to calculate control parameters F0 to F8 (for d=6) of a state feedback loop as described below. The flowchart begins with a step 451 at which the model parameters a, b1 and b2 are read in. Then, at the next step 452, the coefficients A1 and A2 of the characteristic polynomial are read in.

Subsequently, at the next step 453, the control parameters F0 to F8 (for d=6) are sequentially calculated from the model parameters a, b1 and b2 as well as the coefficients A1 and A2 in accordance with the following equations:

$$F0=(1+A1+A2)/(b1+b2)$$

$$F2=-1-a-A1$$

$$F3=a-A2+(1+a)\cdot F2$$

$$F4=(1+a)\cdot F3-a\cdot F2$$

$$F5=(1+a)\cdot F4-a\cdot F3$$

$$F6=(1+a)\cdot F5-a\cdot F4$$

$$F7=(1+a)\cdot F6-a\cdot F5$$

$$F1=a/(a\cdot b1+b2)\cdot(a\cdot F7-b1\cdot F0)$$

$$F8=b2/a\cdot F1$$

FAF Calculation

An FAF computation program represented by a flowchart shown in FIG. 10 is invoked at the step 306 of the flowchart shown in FIG. 3 to represent the fuel-injection-amount calculation program. As shown in FIG. 10, the program begins with a step 461 at which a counter for counting a post-engine-start processing count k is cleared. Then, at the next step 462, a present fuel excessive rate $\phi$(i), a target fuel excessive rate $\phi$ref and the control parameters F0 to F8 (for d=6) are read in. Subsequently, at the next step 463, a deviation of the present fuel excessive rate $\phi$(i) from the target fuel excessive rate $\phi$ref is calculated as follows:

$$e(i)=\phi\text{ref}-\phi(i)$$

The flow of the program then goes on to a step 464 to determine whether the post-engine-start processing count k is equal to 0, that is, to determine whether the present timing is a timing of first processing immediately after a start of the engine 11. If the post-engine-start processing count k is equal to 0 or the present timing is the timing of the first processing immediately after a start of the engine 11, the flow of the program goes on to a step 465 at which initialization is carried out to set $\phi$(i−1)=$\phi$(i), where notations $\phi$(i−1) and $\phi$(i) denote immediately preceding and present fuel excessive rates respectively, and to clear stored values of all the previous air-fuel ratio correction coefficient correction values ΔFAF (i−7) to ΔFAF (i−1) to zeros. Then, at the next step 466, a change Δ$\phi$(i) from the immediately preceding fuel excessive rate $\phi$(i−1) to the present fuel excessive rate $\phi$(i) is computed as follows:

$$\Delta\phi(i)=\phi(i)-\phi(i-1)$$

If the post-engine-start processing count k is not equal to 0 or the present timing is the timing of the second or subsequent processing immediately after a start of the engine 11, on the other hand, the flow of the program goes on directly to the step 466 at which the change Δ$\phi$(i) from the immediately preceding fuel excessive rate $\phi$(i−1) to the present fuel excessive rate $\phi$(i) is calculated as described above without carrying out the initialization at the step 465.

Then, at the next step 467, the present air-fuel ratio correction coefficient correction value ΔFAF (i) is computed as follows:

$$\Delta FAF(i)=F1\cdot\Delta\phi(i)+F2\cdot\Delta FAF(i-1)+\ldots$$

$$\ldots+F7\cdot\Delta FAF(i-6)+F8\cdot\Delta FAF(i-7)+F0\cdot e(i)$$

Subsequently, at the next step 468, the present air-fuel ratio correction coefficient correction value ΔFAF (i) is added to the immediately preceding air-fuel ratio correction coefficient FAF (i−1) to find the present air-fuel ratio correction coefficient FAF (i) as follows:

$$FAF(i)=FAF(i-1)+\Delta FAF(i)$$

Then, at the next step 469, the immediately preceding fuel excessive rates $\phi$(i−1) and all the previous air-fuel ratio correction coefficient correction values ΔFAF (i−7) to ΔFAF (i−1) are updated in preparation for calculation of the next air-fuel ratio correction coefficient FAF as follows:

$$(i-1)=\phi(i)$$

$$FAF(i-7)=\Delta FAF(i-6)$$

$$FAF(i-6)=\Delta FAF(i-5)$$

$$FAF(i-5)=\Delta FAF(i-4)$$

$$FAF(i-4)=\Delta FAF(i-3)$$

$$FAF(i-3)=\Delta FAF(i-2)$$

$$FAF(i-2)=\Delta FAF(i-1)$$

$$FAF(i-1)=\Delta FAF(i)$$

Subsequently, at the next step 470, a counter for counting the post-engine-start processing count k is incremented. Then, the flow of the program goes back to the step 462. The pieces of processing of the steps 462–470 are carried out repeatedly at fuel-injection intervals to calculate the air-fuel ratio correction coefficient FAF synchronously with the fuel-injection timing of each cylinder.

Figure 11B:
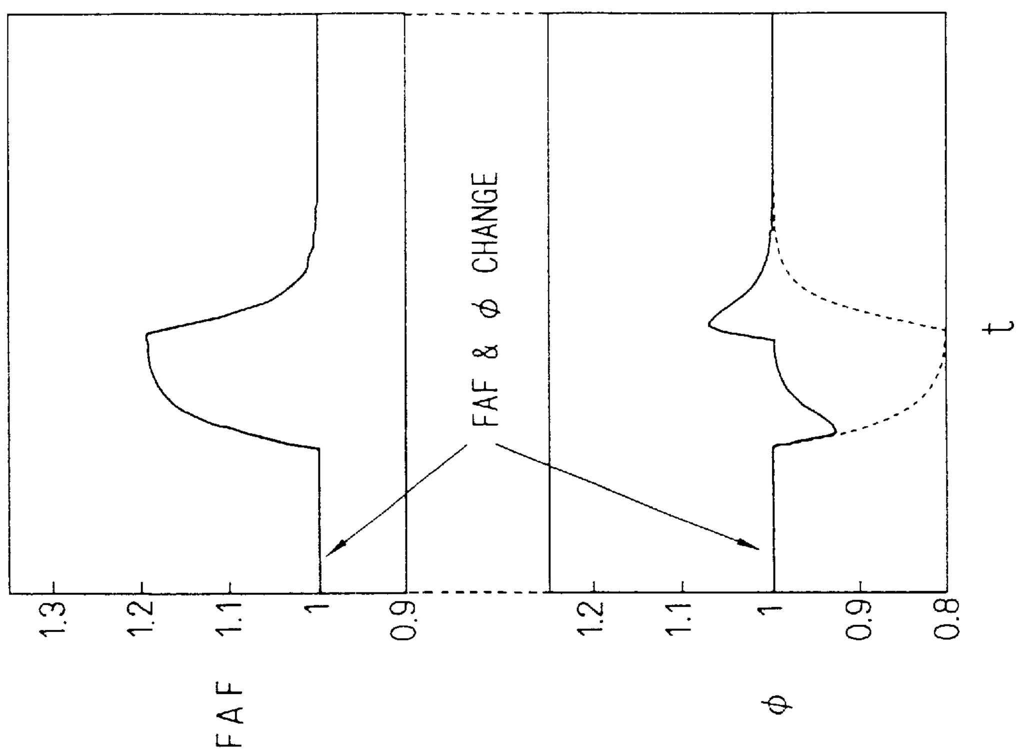
FIGS. 11A and 11B are time charts showing variations in air-fuel ratio correction coefficient FAF and fuel excessive rate $\phi$ (first embodiment)
Figure 11A:
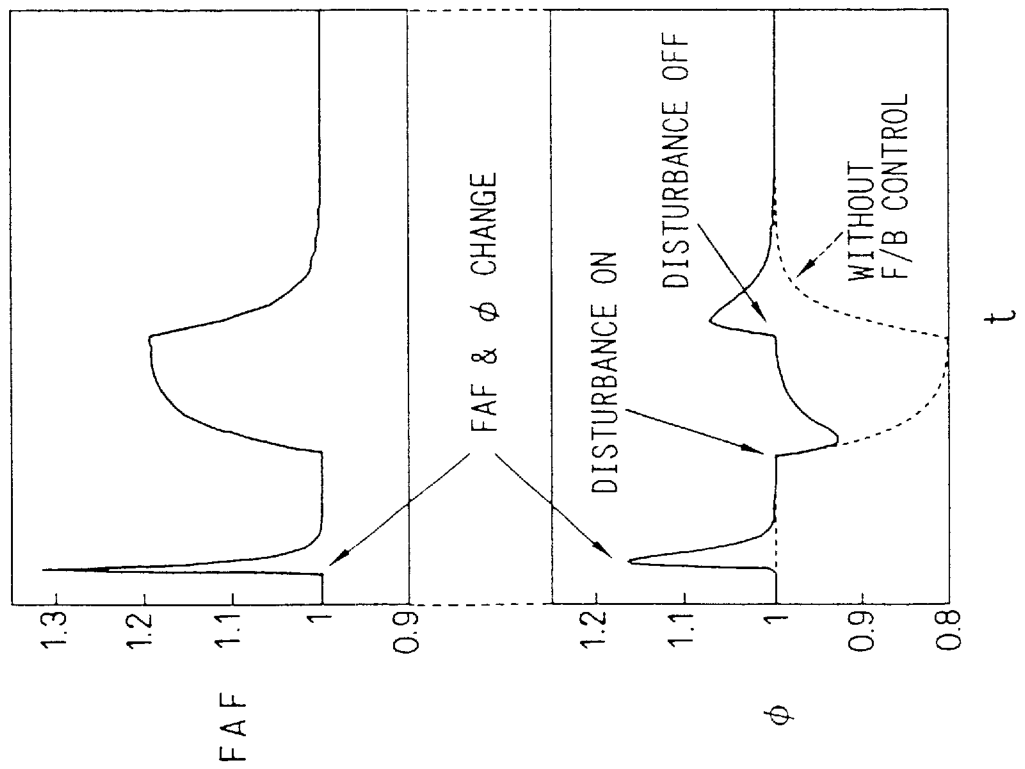
Figure 12:
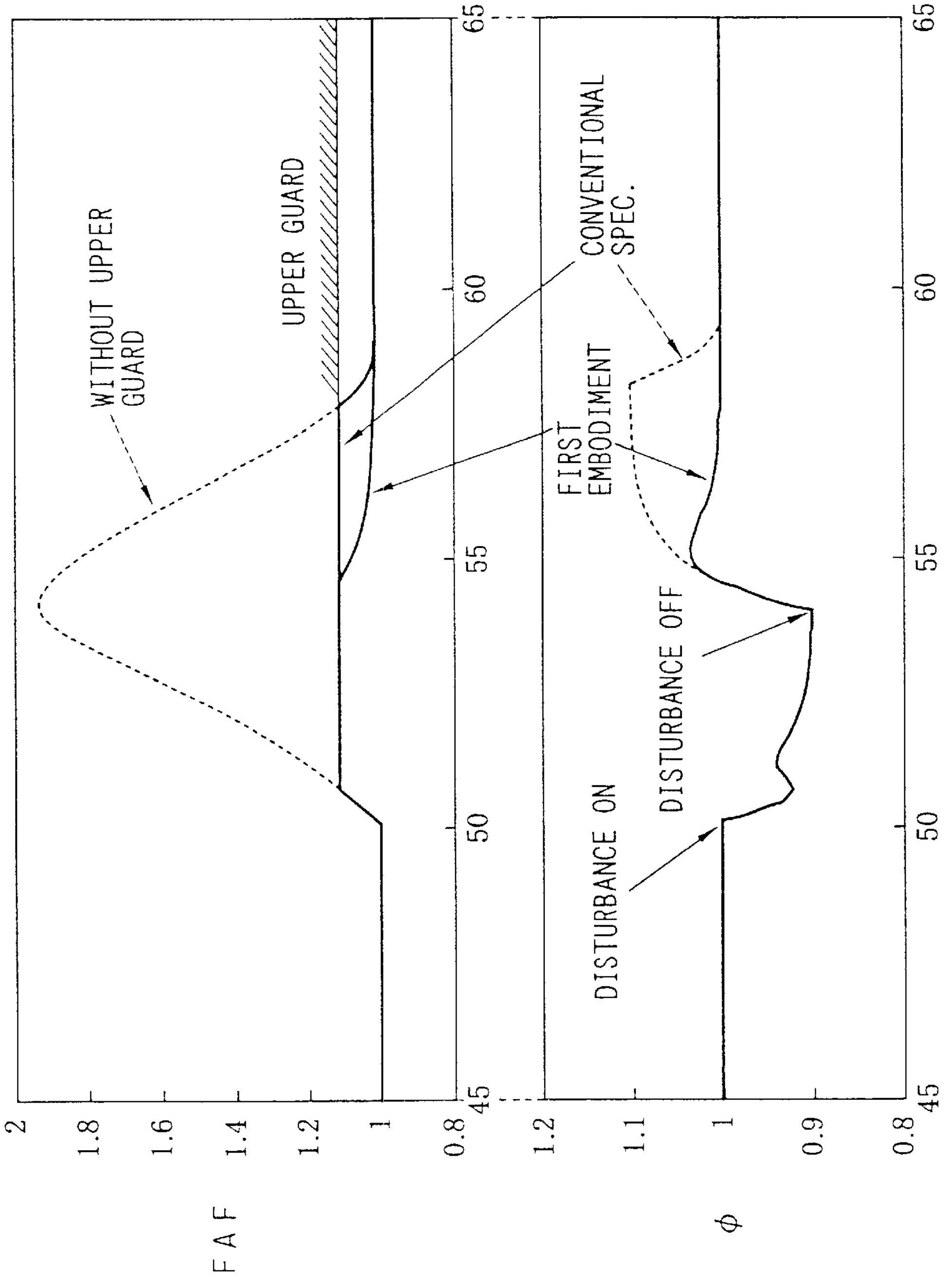
FIG. 12 is a time chart showing recovery performance from an upper guard value in the event of an external disturbance (first embodiment)
Figure 13A:
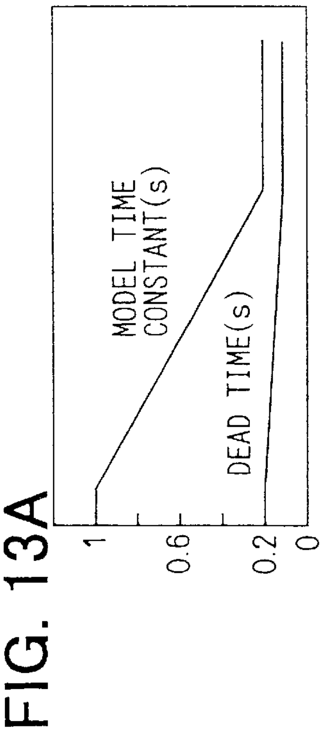
FIGS. 13A–13E are time charts showing behaviors exhibited by the air-fuel ratio correction coefficient FAF and fuel excess ratio $\phi$ (first embodiments)
Figure 13B:
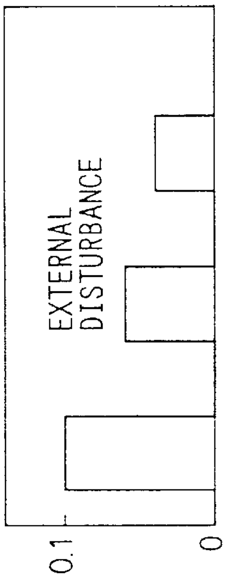
Figure 13C:
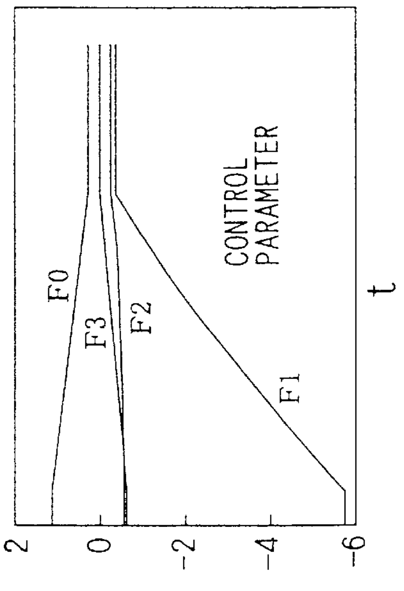
Figure 13D:
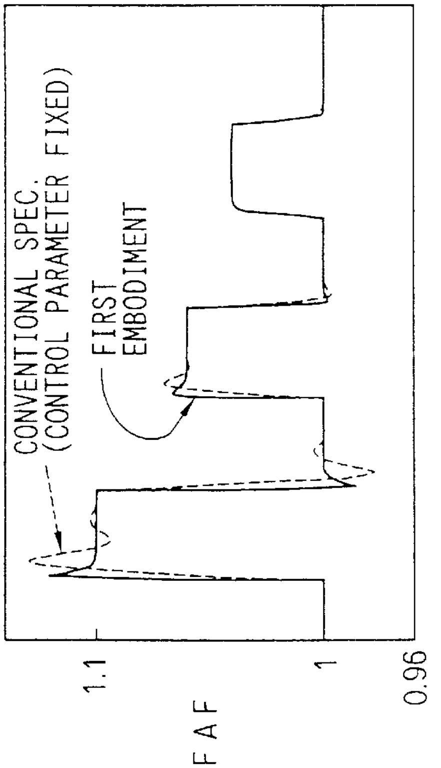
Figure 13E:
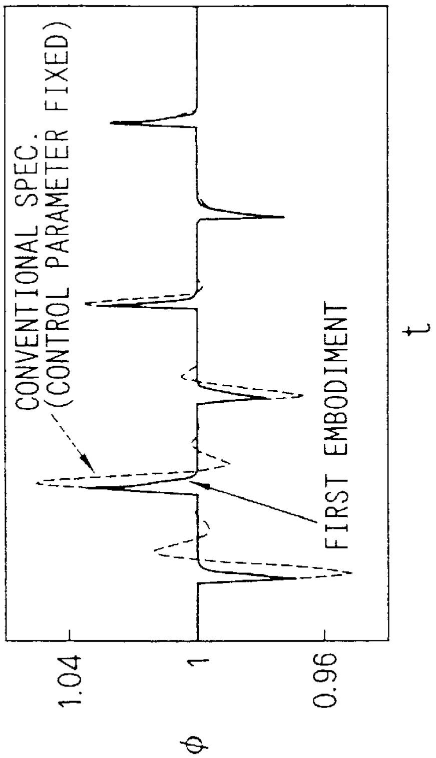

Effects exhibited by the first embodiment described above are explained by comparison with effects of control according to the conventional specifications with reference to FIGS. 11–13. In accordance with the conventional specifications, the air-fuel ratio correction coefficient FAF (i) is calculated from the control parameters F0 to Fd+1 by using the following equation:

$$AF(i)=F(i)\cdot\lambda 1+F2\cdot FAF(i-1)+F3\cdot FAF(i-2)+\ldots$$

$$\ldots+Fd+1\cdot FAF(i-d)+F0\cdot\Sigma(\lambda ref-\lambda(i))$$

FIGS. 11A and 11B are time charts representing variations in air-fuel ratio correction coefficient and fuel excessive rate φ which are observed when control parameters are changed. As shown in FIG. 11A, in control according to the conventional specifications, when the values of the control parameters are changed, the air-fuel ratio correction coefficient FAF is temporarily thrown into confusion at that moment. As a result, the fuel excessive rate φ is also temporarily thrown into confusion.

On the other hand, as shown in FIG. 11B, in the first embodiment, calculation of the air-fuel ratio correction coefficient correction value ΔFAF (i) is based on the control parameters F0 to F8, the fuel-excessive-rate change Δφ(i), the deviation e (i) of the present fuel excessive rate φ(i) from the target fuel excessive rate φref and the previous air-fuel ratio correction coefficient correction values ΔFAF (i–1) to ΔFAF (i–7). Then, the present air-fuel ratio correction coefficient correction value ΔFAF (i) is added to the immediately preceding air-fuel ratio correction coefficient FAF (i–1) to find the present air-fuel ratio correction coefficient FAF (i). Thus, even when the control parameters F0 to F8 are changed in accordance with the operating conditions and the like, the air-fuel ratio correction coefficient FAF and the fuel excessive rate φ (the air-fuel ratio) are not thrown into confusion. As a result, while the control parameters F0 to F8 are being changed in accordance with the operating conditions and the like, stable air-fuel ratio control can be executed.

FIG. 12 is time charts representing recovery performance from an upper guard value of the air-fuel ratio correction coefficient FAF in the event of an external disturbance. The air-fuel ratio correction coefficient FAF may be put in a state of being stuck on the upper guard value in the control according to the conventional specifications. In this case, the air-fuel ratio correction coefficient FAF will be sustained in this state of being stuck on the upper guard value till the air-fuel ratio correction coefficient FAF becomes lower than the upper guard value as if the upper guard value were not imposed on the air-fuel ratio correction coefficient FAF. As a result, the return of the air-fuel ratio correction coefficient FAF to 1.0 and the end of the confusion caused by external disturbances tend to lag behind their respective desired timings as shown by broken lines in FIG. 12.

In the case of the first embodiment, on the other hand, the duration of the state in which the air-fuel ratio correction coefficient FAF is stuck on the upper guard value is shorter than the control according to the conventional specifications. That is, the air-fuel ratio correction coefficient FAF in the first embodiment starts declining earlier than the air-fuel ratio correction coefficient FAF in the control according to the conventional specifications does. As a result, the air-fuel ratio correction coefficient FAF in the first embodiment returns to 1.0 earlier than the air-fuel ratio correction coefficient FAF in the control according to the conventional specifications does and, thus, the confusion caused by external disturbances and experienced by the fuel excess ratio φ (or the air-fuel ratio) also ends earlier as well.

FIGS. 13A–13E are time charts representing behaviors exhibited by the air-fuel ratio correction coefficient FAF and the fuel excess ratio φ (or the air-fuel ratio) when external disturbances are introduced while the model time constant, the dead time and the control parameters are being changed. In the case of the control according to the conventional specifications, since the control parameters are fixed, there is observed a high degree of confusion which is experienced by the air-fuel ratio correction coefficient FAF and the fuel excess ratio φ (or the air-fuel ratio) when external disturbances are introduced.

In the case of the first embodiment, on the other hand, the control parameters are changed in accordance with operating conditions. Thus, there is observed only a low degree of confusion which is experienced by the air-fuel ratio correction coefficient FAF and the fuel excess ratio φ (or the air-fuel ratio) when external disturbances are introduced in comparison with the control according to the conventional specifications. As a result, it is possible to execute relatively stable control of the air-fuel ratio even if external disturbances exist.

Second Embodiment

The first embodiment is an embodiment of the present invention applied to the air-fuel ratio feedback control system. The first embodiment is thus applicable to an internal combustion engine, the air-fuel ratio of which serves as a control object of the feedback control system. FIGS. 14–18 show a second embodiment of the present invention applied to an idle speed control system. The following description explains details of processing carried out by execution of various programs provided by the second embodiment.

Calculation of ISCV Opening

Figure 14:
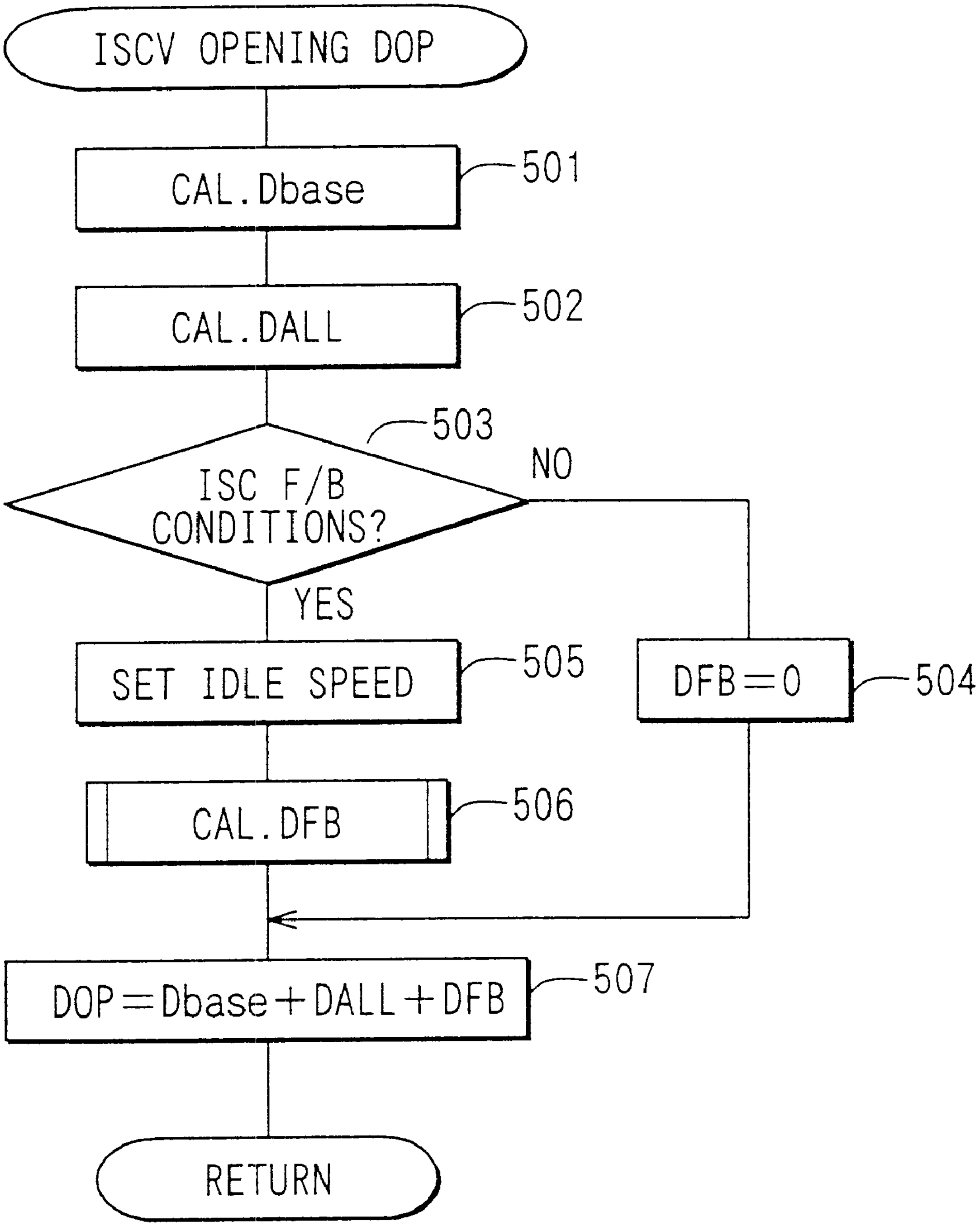
FIG. 14 is a flowchart showing an ISCV-opening calculation program (second embodiment)

An ISCV-opening computation program shown in FIG. 14 is activated at predetermined time intervals or predetermined crank angle intervals to calculate an ISCV opening DOP as described below. In a system having an idle speed control valve, the ISCV opening DOP is the opening of an idle speed control valve (ISCV). In an electronic throttle system for controlling an idle speed by the opening of a throttle valve, a throttle opening in an idle operation is the ISCV opening.

When this program is activated, the program begins with a step 501 at which a base opening Dbase is found from typically a map in accordance with the present operating conditions of the engine 11. Then, at the next step 502, a variety of correction quantities DALL is calculated for the basic opening Dbase. The correction quantities include a correction amount based on the temperature of cooling water. The flow of the program then goes on to a step 503 to determine whether feedback conditions of idle-speed control (ISC) are satisfied. If the feedback conditions of idle-speed control (ISC) are not satisfied, the flow of the program goes on to a step 504 at which an ISC feedback correction amount DFB is set at 0.

If the feedback conditions of idle-speed control (ISC) are found satisfied, on the other hand, the flow of the program goes on to a step 505 at which a target idle speed is set from typically a map in accordance with, among other information, a cooling-water temperature THW, an ON/OFF signal of the air conditioner and a torque-converter load signal. Then, the flow of the program goes on to a step 506 to execute an ISC feedback correction amount calculation program represented by a flowchart shown in FIG. 18 to be described later in order to compute an ISC feedback correction quantity DFB.

After the ISC feedback correction amount DFB is set at the step 504 or 506 as described above, the flow of the program goes on to a step 507 to find an ISCV opening DOP by addition of the various correction quantities DALL and the basic opening Dbase to the ISC feedback correction amount DFB as follows:

$$DOP=D\text{base}+DALL+DFB$$

Calculation of Control-Object Characteristic Values

Figure 15:
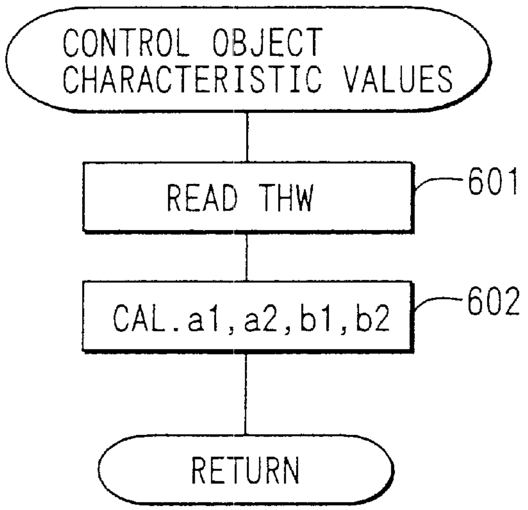
FIG. 15 is a flowchart showing a control object characteristic value calculation program (second embodiment)

A control object characteristic value calculation program shown in FIG. 15 is activated at predetermined time intervals or predetermined crank angle intervals to calculate the characteristic values of the control object such as model parameters a1, a2, b1 and b2 as described below. The program starts with a step 601 at which a cooling-water temperature THW is read in. Then, at the next step 602, the model parameters a1, a2, b1 and b2 are found typically from a map in accordance with the cooling-water temperature THW.

As described above, the model parameters a1, a2, b1 and b2 are each found in accordance with the cooling-water temperature THW. This is because, during execution of the idle-speed control, variations in operating conditions including the speed of the engine 11 are small so that a target idle speed can be set in accordance with the cooling-water temperature THW or the like. It should be noted that the model parameters a1, a2, b1 and b2 can also be set in accordance with the ON/OFF signal of the air conditioner or the torque-converter load signal in addition to the cooling-water temperature THW.

Calculation of Attenuation Coefficient ζ and Undumped-Natural Angular Frequency ω

Figure 16:
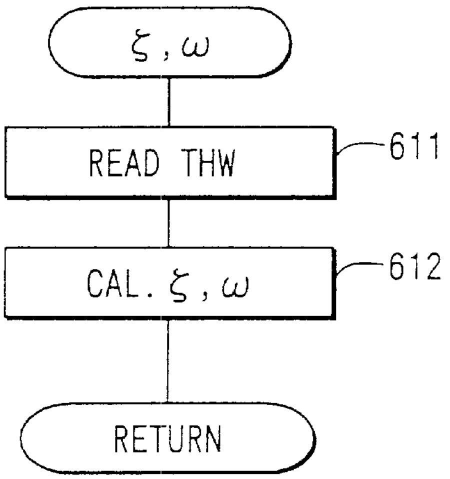
FIG. 16 is a flowchart showing an attenuation coefficient $\zeta$ and undamped natural angular frequency $\omega$ calculation program (second embodiment)

An attenuation coefficient ζ and undamped natural angular frequency ω calculation program represented by a flowchart shown in FIG. 16 is activated at predetermined time intervals or predetermined crank angle intervals to calculate the attenuation coefficient ζ and the undamped natural angular frequency ω as described below. The flowchart begins with a step 611 at which a cooling-water temperature THW is read in. Then, at the next step 612, the attenuation coefficient ζ and the undamped natural angular frequency ω are each found typically from a map in accordance with the cooling-water temperature THW.

Here, the attenuation coefficient ζ and the undamped natural angular frequency ω are each found typically in accordance with the cooling-water temperature THW. This is because, during execution of the idle-speed control, variations in operating conditions including the speed of the engine are small so that a target idle speed can be set in accordance with the cooling-water temperature THW or the like. It should be noted that the model parameters a1, a2, b1 and b2 can also be set in accordance with the ON/OFF signal of the air conditioner or the torque-converter load signal in addition to the cooling-water temperature THW.

It is also worth noting that the coefficients A1 and A2 of the characteristic polynomial can be calculated by executing the characteristic polynomial coefficient computation program represented by the flowchart shown in FIG. 8 and explained earlier in the description of the first embodiment.

Calculation of Control Parameters

Figure 17:
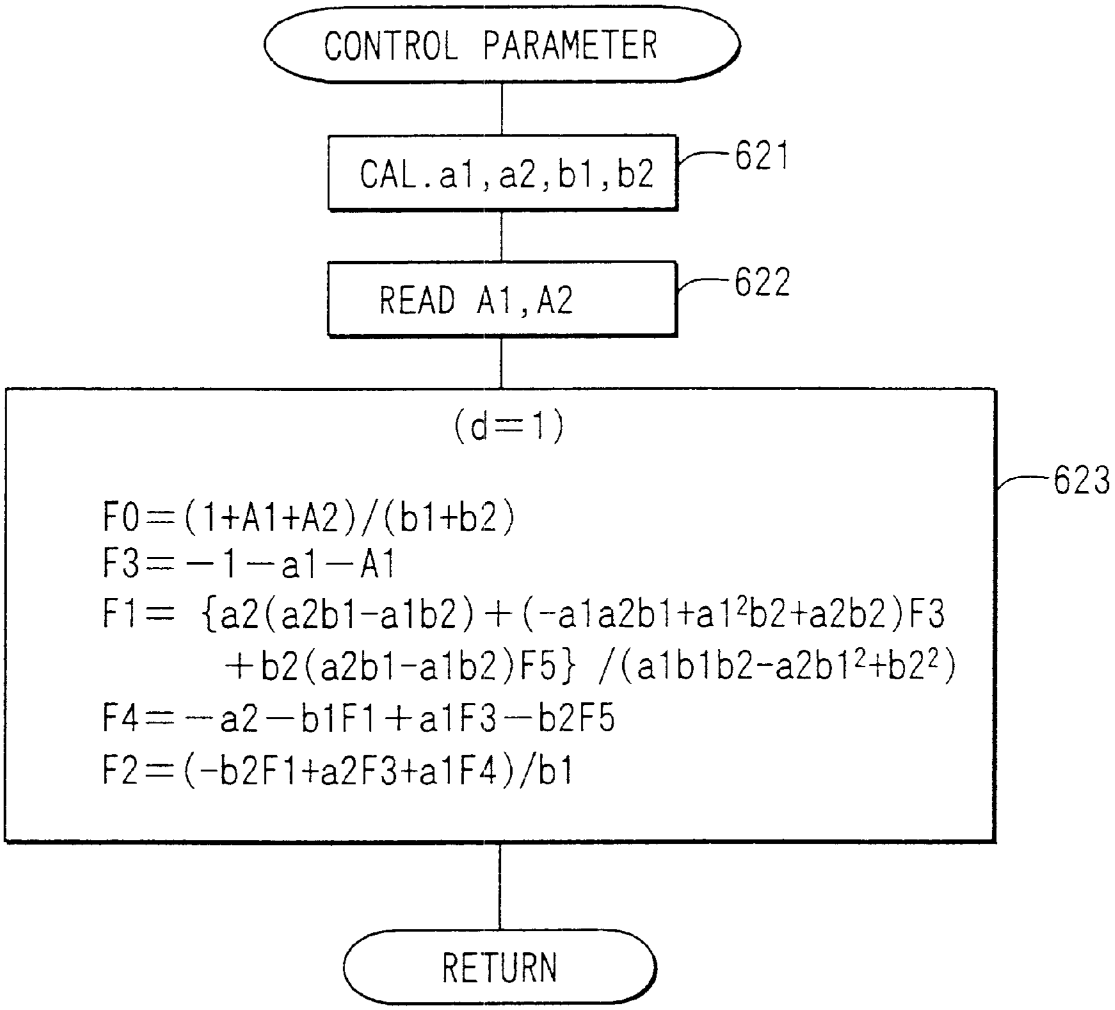
FIG. 17 is a flowchart showing a control-parameter calculation program (second embodiment)

A control-parameter calculation program represented by a flowchart shown in FIG. 17 is activated at predetermined time intervals or predetermined crank angle intervals to calculate control parameters F0 to F4 (for d=1) of a state feedback loop as described below. The flowchart begins with a step 621 at which the model parameters a1, a2, b1 and b2 are read in. Then, at the next step 622, the coefficients A1 and A2 of the characteristic polynomial are read in.

Subsequently, at the next step 623, the control parameters F0 to F4 (for d=1) are sequentially calculated from the model parameters a1, a2, b1 and b2 as well as the coefficients A1 and A2 in accordance with the following equations:

$$F0=(1+A1+A2)/(b1+b2)$$

$$F3=-1-a-A1$$

$$F1=\{a2(a2b1-a1b2)+(-a1a2b1+(a1^2)b2+a2b2)F3+b2(a2b1-a1b2)F5\}/(a1b1b2+a2b1^2+b2^2)$$

$$F4=-a2-b1F1+a1F3-b2F5$$

$$F2=(-b2F1+a2F3+a1F4)/b1$$

Figure 18:
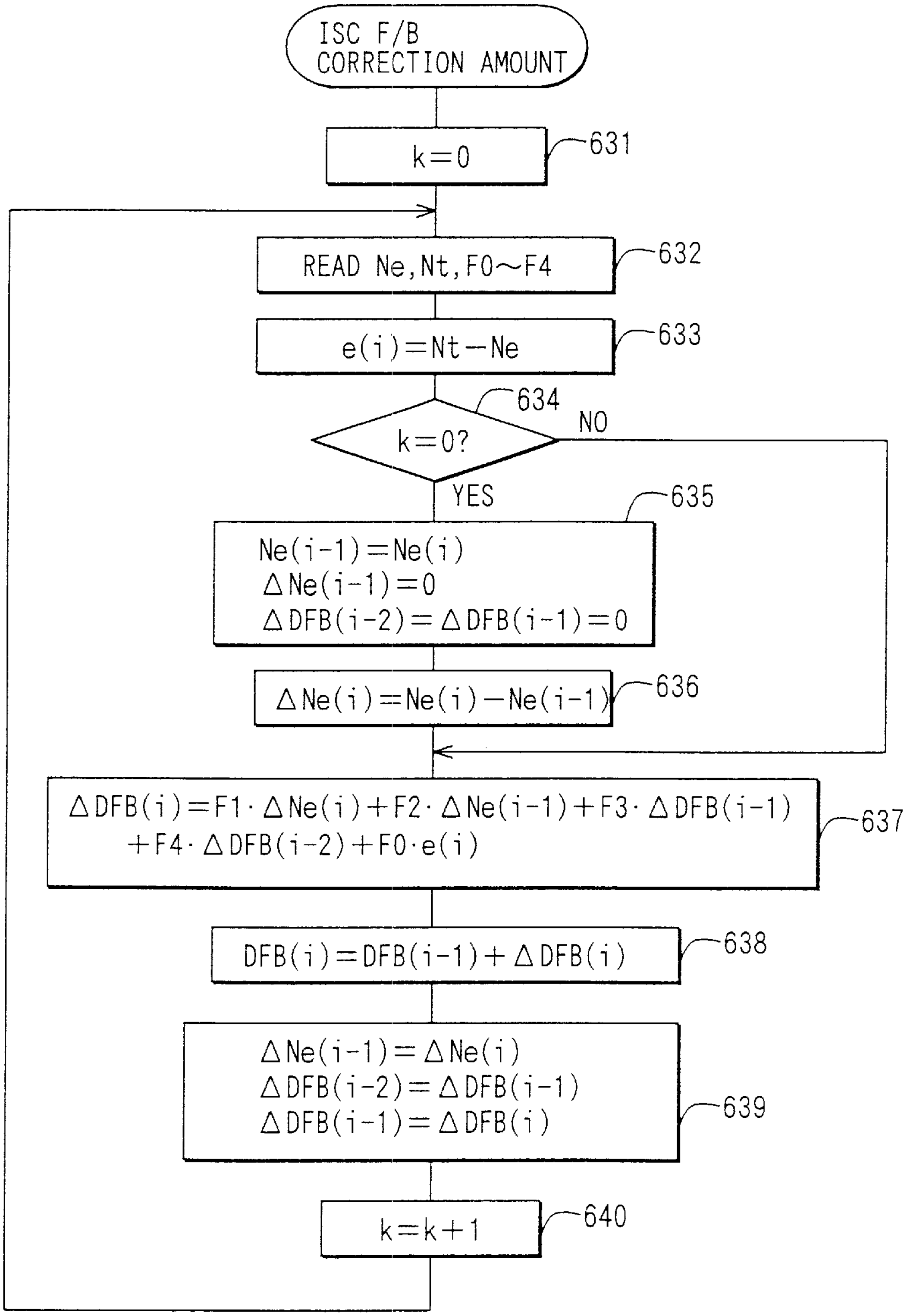
FIG. 18 is a flowchart showing an ISC feedback correction amount calculation program (second embodiment).

An ISC feedback correction amount calculation program represented by a flowchart shown in FIG. 18 is activated to calculate an ISC feedback correction amount DFB at the step 506 of the flowchart shown in FIG. 14 to represent the ISCV-opening calculation program. The ISC feedback correction amount calculation program starts with a step 631 at which the counter for counting the post-engine-start processing count k is cleared. Then, at the next step 632, a current engine speed Ne, a target idle speed Nt and control parameters F0 to F4 (for d=1) are read in. Subsequently, at the next step 633, a deviation e (i) of the current engine speed Ne from the target idle speed Nt is calculated as follows:

$$e(i)=Nt-Ne$$

The flow of the program then goes on to a step 634 to determine whether the post-engine-start processing count k is equal to 0, that is, to determine whether the present timing is a timing of first processing immediately after a start of the engine 11. If the post-engine-start processing count k is equal to 0 or the present timing is the timing of the first processing immediately after a start of the engine 11, the flow of the program goes on to a step 635 at which initialization is carried out to set the immediately preceding engine speed Ne (i−1) at the present engine speed Ne (i) as well as set the immediately preceding engine speed change ΔNe (i−1), a previous ISC feedback correction amount correction value ΔDFB (i−2) and an immediately preceding ISC feedback correction amount correction value ΔDFB (i−1) at 0.

Then, the flow of the program goes on to a step 636 to calculate a change in engine speed ΔNe (i) from the immediately preceding engine speed Ne (i−1) to the current engine speed Ne (i) as follows.

$$\Delta Ne(i)=Ne(i)-Ne(i-1)$$

Subsequently, at the next step 637, a present ISC feedback correction amount correction value ΔDFB (i) is calculated as follows:

$$\Delta DFB(i)=F1\cdot\Delta Ne(i)+F2\cdot\Delta Ne(i-1)+F3\cdot\Delta DFB(i-1)+F3\cdot\Delta DFB(i-1)+F4\cdot\Delta DFB(i-2)+F0\cdot e(i)$$

Then, at the next step 638, a present ISC feedback correction amount DFB (i) is calculated by adding the present ISC feedback correction amount correction value ΔDFB (i) to an immediately preceding ISC feedback correction amount DFB (i−1) as follows:

$$DFB(i)=DFB(i-1)+\Delta DFB(i)$$

Subsequently, at the next step 639, in preparation for calculation of the next ISC feedback correction amount DFB, the immediately preceding engine speed change ΔNe (i−1), the previous ISC feedback correction amount correction value ΔDFB (i−2) and the immediately preceding ISC feedback correction amount correction value ΔDFB (i−1) are updated as follows:

$\Delta Ne(i-1)=\Delta Ne(i)$ $\Delta DFB(i-2)=\Delta DFB(i-1)$ $\Delta DFB(i-1)=\Delta DFB(i)$ Then, at the next step 640, a counter for counting the post-engine-start processing count k is incremented. The flow of the program then goes back to the step 632. The pieces of processing of the steps 632–640 are carried out repeatedly at predetermined time or crank angle intervals to calculate the ISC feedback correction amount DFB (i).

In the second embodiment described above, an ISC feedback correction amount correction value ΔDFB (i) is calculated on the basis of the control parameters F0 to F4, the engine speed change ΔNe (i), the deviation e (i) of the current engine speed Ne from the target idle speed Nt, the previous ISC feedback correction amount correction value ΔDFB (i–2) and the immediately preceding ISC feedback correction amount correction value ΔDFB (i–1) and, then, the present ISC feedback correction amount DFB (i) is calculated by adding the present ISC feedback correction amount correction value ΔDFB (i) to the immediately preceding ISC feedback correction amount DFB (i–1). Thus, the ISC feedback correction amount DFB (i) and the engine speed Ne are not thrown into confusion even if the control parameters F0–F4 are changed in accordance with operating conditions and the like. As a result, it is possible to execute stable control of the idle speed while the control parameters F0–F4 are being changed.

Modifications

In the first and second embodiments, the control parameters are calculated by adoption of the pole-assignment method. Alternatively, the control parameters may be calculated by using an optimum regulator.

In addition, the model parameters may be calculated onboard by adoption of a system identification method from a relation between operation quantities such as the air-fuel ratio correction coefficient FAF and the ISC-feedback correction amount and control amounts such as the air-fuel ratio and the speed of the engine 11.

What is claimed is:

1. A control apparatus for an internal combustion engine for feedback controlling an operation amount of an actuator driving a control object employed in the internal combustion engine by using a control model simulating the control object, said control apparatus comprising:

a state detecting means for detecting a state of the control object;

a state variation outputting means for outputting present and previous operation amounts as well as present and previous state detection values detected by said state detecting means as a state variable representing an internal state of the control model;

a control parameter processing means for finding a control parameter by using model parameters of the control model;

a correction value processing means for finding an operation amount correction value based on a difference between a control parameter found by said control parameter processing means and a state variable output by said state variation outputting means and a deviation of a detection value output by said state detecting means from a control target value; and an operation amount processing means for adding the operation amount correction value to a previous operation amount in order to find a present operation amount;

wherein said control parameter processing means calculates coefficients of a characteristic polynomial of the control model by adoption of a pole-assignment method, and calculates the control parameter from the coefficients of the characteristic polynomial and the model parameters.

2. A control apparatus according to claim 1, wherein said control parameter processing means changes the model parameters in accordance with an operating condition of the internal combustion engine.

3. A control apparatus of according to claim 2, wherein any of a speed of the internal combustion engine, an intake air volume, a load, a temperature of cooling water and a lapse of time since a start of the internal combustion engine are used as the operating condition.

4. A control apparatus according to claim 1, wherein said control parameter processing means changes a target pole in accordance with an operating condition of the internal combustion engine.

5. A control apparatus according to claim 1, wherein said control parameter processing means sets a target pole at a fast response for a large air amount operation and sets the target pole at a slow response for a small air amount operation.

6. A control apparatus according to claim 1, wherein said operation amount processing means processes an air-fuel ratio correction coefficient by using a control model simulating an air-fuel ratio feedback control system of the internal combustion engine.

7. A control apparatus according to claim 1, wherein said operation amount processing means processes an operation amount of the actuator operating an idle speed by using a control model simulating an idle speed control system of the internal combustion engine.

8. A method of feedback controlling an operation amount of an actuator driving a control object employed in an internal combustion engine by using a control model simulating the control object, said method comprising:

detecting a state of the control object;

outputting present and previous operation amounts as well as present and previous state detection values detected as a state variable representing an internal state of the control model;

finding a control parameter by using model parameters of the control model;

finding an operation amount correction value based on a difference between the found control parameter and the state variable and a deviation of a detection value output from a control target value;

adding the operation amount correction value to a previous operation amount in order to find a present operation amount;

wherein coefficients of a characteristic polynomial of the control model are calculated by adoption of a pole-assignment method, and the control parameter is calculated from the coefficients of the characteristic polynomial and the model parameters.

9. A method according to claim 8, wherein the model parameters are changed in accordance with an operating condition of the internal combustion engine.

10. A method according to claim 9, wherein any of a speed of the internal combustion engine, an intake air volume, a load, a temperature of cooling water and a lapse of time since a start of the internal combustion engine are used as the operating condition.

11. A method according to claim 8, wherein a target pole is changed in accordance with an operating condition of the internal combustion engine.

12. A method according to claim 8, wherein a target pole is set at a fast response for a large air amount operation and sets the target pole is set at a slow response for a small air amount operation.

13. A method according to claim 8, wherein an air-fuel ratio correction coefficient is processed by using a control model simulating an air-fuel ratio feedback control system of the internal combustion engine.

14. A method according to claim 8, wherein an operation amount of the actuator operating an idle speed is processed by using a control model simulating an idle speed control system of the internal combustion engine.

* * * * *